US 11,637,006 B2

(12) United States Patent
Datwani et al.

(10) Patent No.: US 11,637,006 B2
(45) Date of Patent: Apr. 25, 2023

(54) SYSTEM AND METHOD FOR THE ACOUSTIC LOADING OF AN ANALYTICAL INSTRUMENT USING A CONTINUOUS FLOW SAMPLING PROBE

(71) Applicants: Labcyte, Inc., San Jose, CA (US); DH Technologies Development Pte. Ltd., Singapore (SG)

(72) Inventors: Sammy Datwani, San Jose, CA (US); Don W. Arnold, Livermore, CA (US); Lucien P. Ghislain, San Jose, CA (US); Chang Liu, Richmond Hill (CA); Thomas Covey, New Market (CA)

(73) Assignee: Labcyte, Inc., San Jose, CA (US)

( * ) Notice: Subject to any disclaimer, the term of this patent is extended or adjusted under 35 U.S.C. 154(b) by 57 days.

(21) Appl. No.: 17/410,758

(22) Filed: Aug. 24, 2021

(65) Prior Publication Data

US 2021/0384023 A1 Dec. 9, 2021

Related U.S. Application Data

(63) Continuation of application No. 16/985,076, filed on Aug. 4, 2020, now Pat. No. 11,133,163, which is a
(Continued)

(51) Int. Cl.
*G01N 29/02* (2006.01)
*H01J 49/04* (2006.01)
(Continued)

(52) U.S. Cl.
CPC ........ *H01J 49/0454* (2013.01); *B01L 3/0268* (2013.01); *G01N 29/02* (2013.01);
(Continued)

(58) Field of Classification Search
CPC .. H01J 49/0454; H01J 49/045; H01J 49/0031; H01J 49/0404; H01J 49/165;
(Continued)

(56) References Cited

U.S. PATENT DOCUMENTS 7,910,881 B2 3/2011 Nikolaev et al.
9,395,278 B2 7/2016 Van Berkel et al.
(Continued)

FOREIGN PATENT DOCUMENTS

WO 2014154502 A1 10/2014

OTHER PUBLICATIONS

"PCT Search Report and Written Opinion, PCT/US2018/062337", dated Feb. 11, 2019.
(Continued)

*Primary Examiner* — Kiet T Nguyen
(74) *Attorney, Agent, or Firm* — Dianne E. Reed; VLP Law Group LLP

(57) ABSTRACT

A system and method are provided for loading a sample into an analytical instrument using acoustic droplet ejection ("ADE") in combination with a continuous flow sampling probe. An acoustic droplet ejector is used to eject small droplets of a fluid sample containing an analyte into the sampling tip of a continuous flow sampling probe, where the acoustically ejected droplet combines with a continuous, circulating flow stream of solvent within the flow probe. Fluid circulation within the probe transports the sample through a sample transport capillary to an outlet that directs the analyte away from the probe to an analytical instrument, e.g., a device that detects the presence, concentration quantity, and/or identity of the analyte. When the analytical instrument is a mass spectrometer or other type of device requiring the analyte to be in ionized form, the exiting droplets pass through an ionization region, e.g., an electro-
(Continued)

spray ion source, prior to entering the mass spectrometer or other analytical instrument. The method employs active flow control and enables real-time kinetic measurements.

20 Claims, 31 Drawing Sheets

Related U.S. Application Data continuation of application No. 16/198,667, filed on Nov. 21, 2018, now Pat. No. 10,770,277.

(60) Provisional application No. 62/590,079, filed on Nov. 22, 2017.

(51) Int. Cl.
    *H01J 49/16* (2006.01)
    *H01J 49/00* (2006.01)
    *B01L 3/02* (2006.01)
    *G01N 29/22* (2006.01)

(52) U.S. Cl.
    CPC ........ *G01N 29/222* (2013.01); *H01J 49/0031* (2013.01); *H01J 49/0404* (2013.01); *H01J 49/045* (2013.01); *H01J 49/165* (2013.01); *B01L 2400/0436* (2013.01); *B01L 2400/0439* (2013.01)

(58) Field of Classification Search
    CPC .......... B01L 3/0268; B01L 2400/0436; B01L 2400/0439; G01N 29/02; G01N 29/222
    USPC ........................................................ 250/288
    See application file for complete search history.

(56) References Cited

U.S. PATENT DOCUMENTS

| | | | |
|---|---|---|---|
| 9,779,926 | B2 | 10/2017 | Van Berkel et al. |
| 9,869,661 | B2 | 1/2018 | Van Berkel |
| 2002/0109084 | A1 | 8/2002 | Ellson et al. |
| 2002/0125424 | A1 | 9/2002 | Ellson et al. |
| 2003/0150257 | A1 | 8/2003 | Mutz et al. |
| 2004/0118953 | A1 | 6/2004 | Elrod et al. |
| 2005/0029440 | A1 | 2/2005 | Laurell et al. |
| 2009/0185007 | A1 | 7/2009 | Silverbrook |
| 2010/0224013 | A1 | 9/2010 | Van Berkel et al. |
| 2014/0166875 | A1 | 6/2014 | Trimpin |
| 2014/0283627 | A1 | 9/2014 | Hattingh et al. |
| 2014/0283628 | A1 | 9/2014 | Hattingh et al. |
| 2014/0319335 | A1 | 10/2014 | Morris et al. |
| 2016/0299041 | A1 | 10/2016 | Kertesz et al. |
| 2016/0299109 | A1 | 10/2016 | Van Berkel |
| 2017/0176401 | A1 | 6/2017 | Bajic et al. |
| 2017/0243729 | A1 | 8/2017 | Morris et al. |
| 2019/0157061 | A1* | 5/2019 | Datwani ................. B05B 17/06 |

OTHER PUBLICATIONS

Sinclair, Ian, et al., "Novel Acoustic Loading of a Mass Spectrometer: Toward Next-Generation High-Throughput MS Screening", Journal of Laboratory Automation, vol. 21(1), Feb. 2016, pp. 19-26.
Van Berkel, Gary J., et al., "Immediate drop on demand technology (I-DOT) coupled with mass spectrometry via an open port sampling interface", Bioanalysis, vol. 9, No. 21, Nov. 2, 2017, pp. 1667-1679.

* cited by examiner

1. Supercritical Vortex

2. Critical Vortex

3. Subcritical Vortex

4. Balanced

5. Pendant Drop

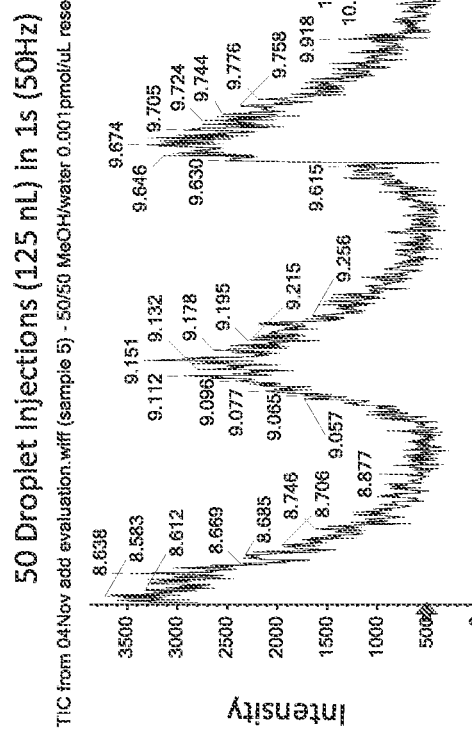
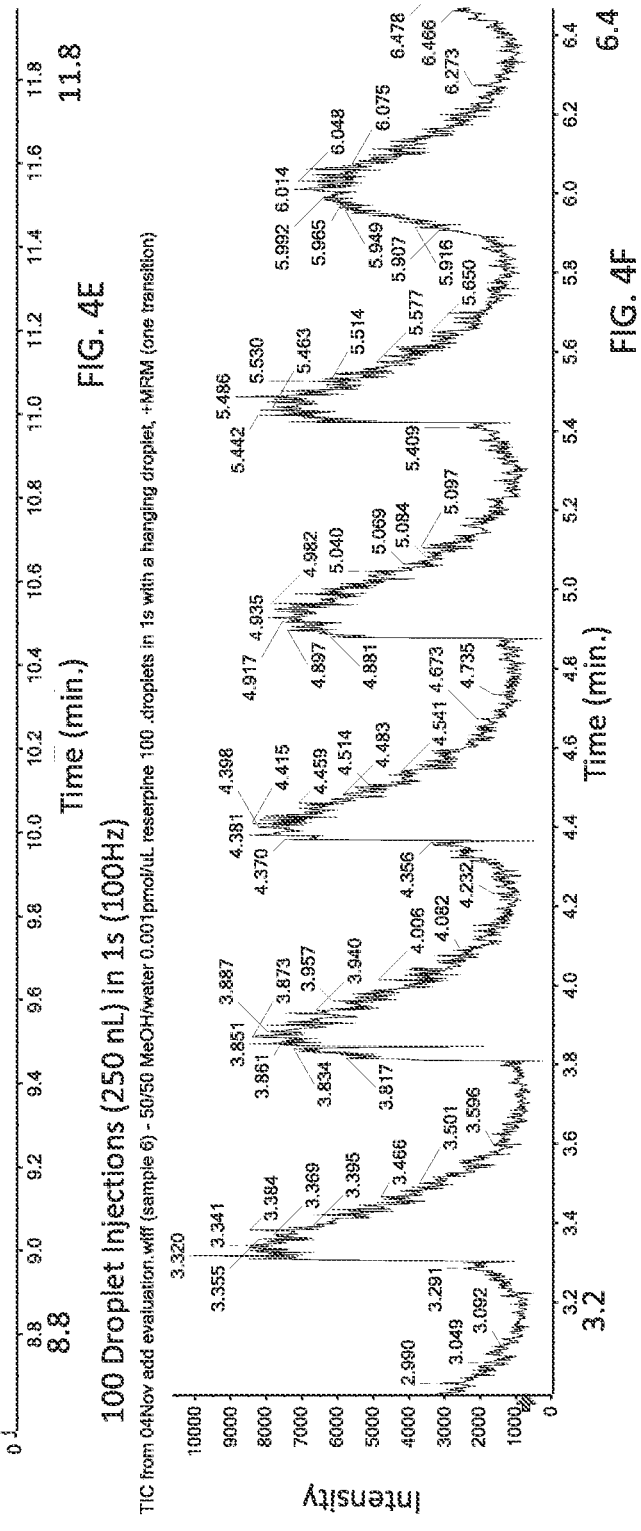
FIG. 4E
FIG. 4F

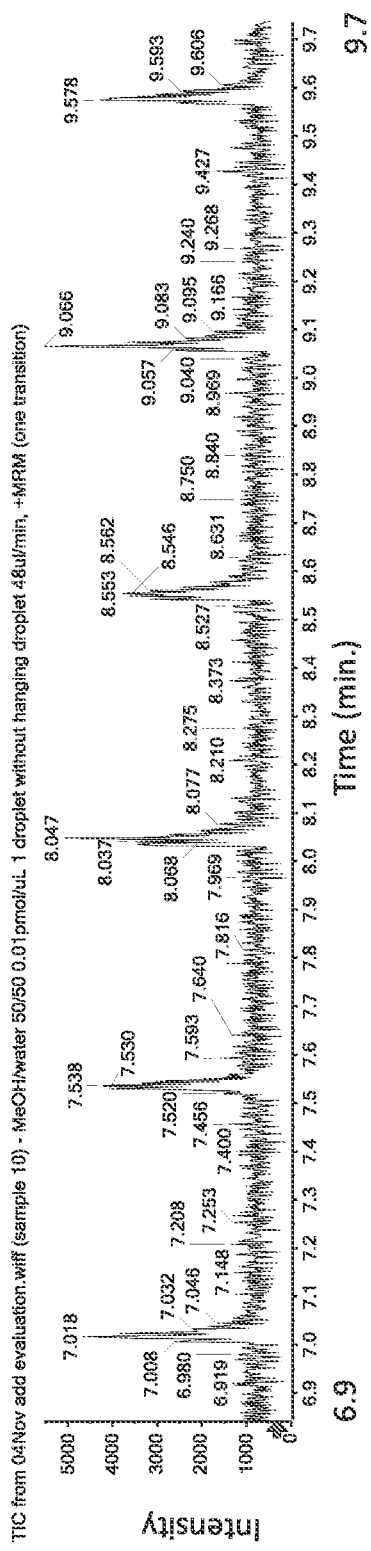
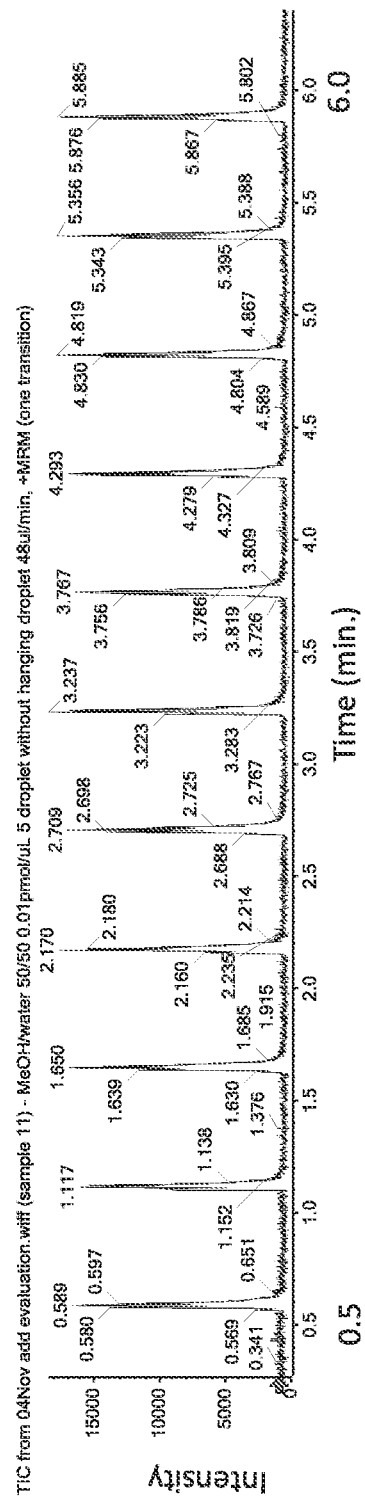
FIG. 5A
FIG. 5B

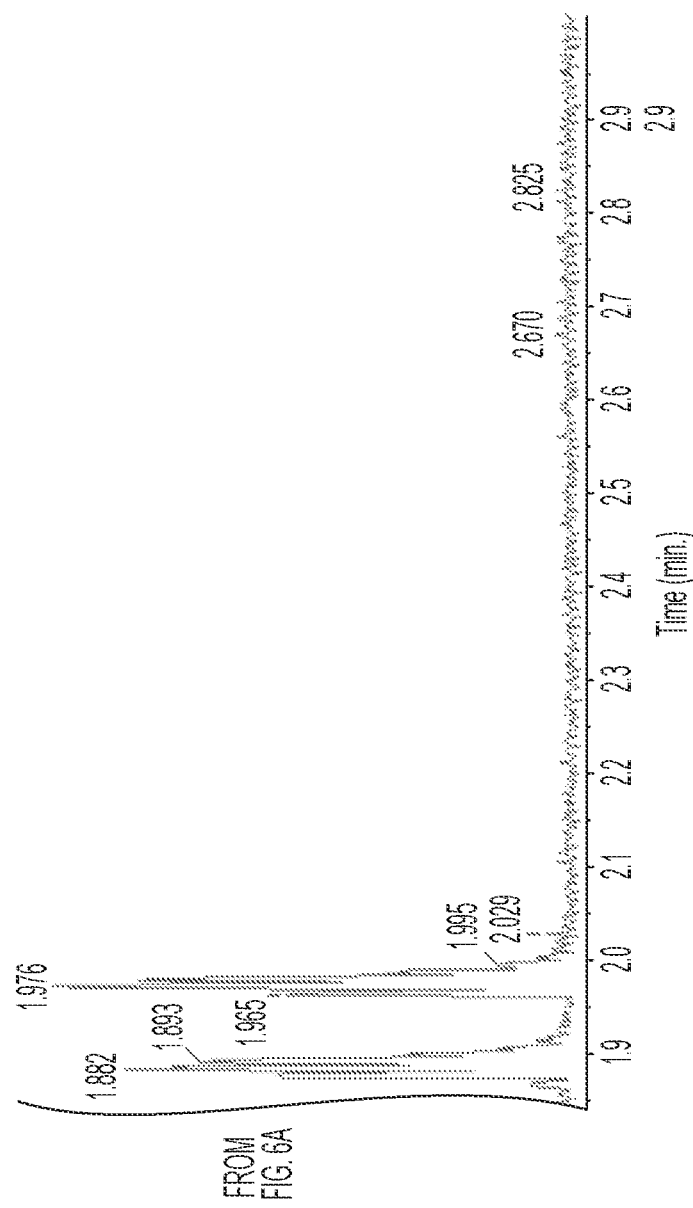

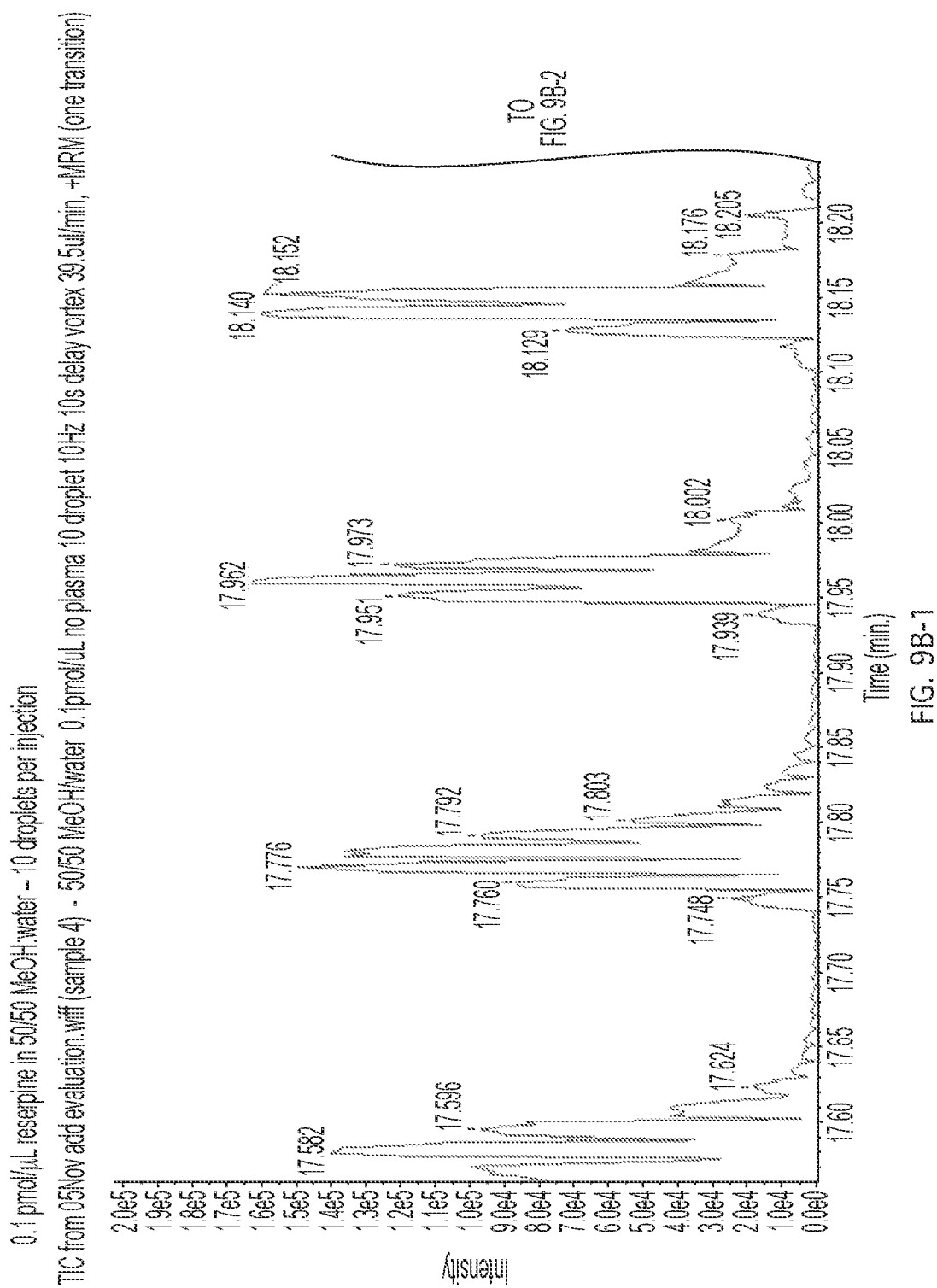

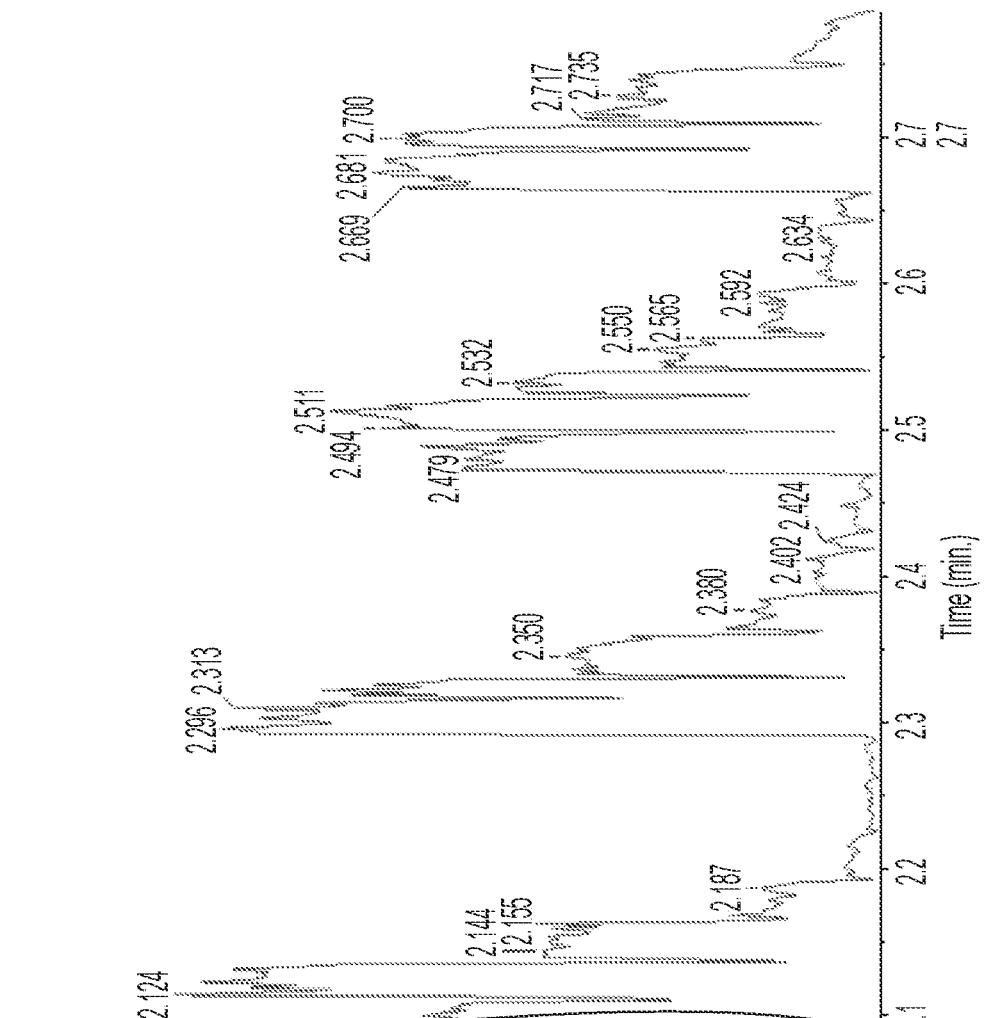

SYSTEM AND METHOD FOR THE ACOUSTIC LOADING OF AN ANALYTICAL INSTRUMENT USING A CONTINUOUS FLOW SAMPLING PROBE

CROSS-REFERENCE TO RELATED APPLICATIONS

This application is a continuation of U.S. Ser. No. 16/985,076, filed Aug. 4, 2020, which is a continuation of U.S. Ser. No. 16/198,667, filed Nov. 21, 2018, which claims priority under 35 U.S.C. § 119(e)(1) to Provisional U.S. Patent Application Ser. No. 62/590,079, filed Nov. 22, 2017, both incorporated by reference herein.

TECHNICAL FIELD

The present invention relates generally to systems and methods for transporting a fluid sample to an analytical instrument, and more particularly relates to such systems and methods that that make use of a continuous flow sampling probe. The invention finds utility in the fields of analytical chemistry, biological research, and medicine.

BACKGROUND

Accurate determination of the presence, identity, concentration, and/or quantity of an analyte in a sample is critically important in many fields. Many techniques used in such analyses involve ionization of species in a fluid sample prior to introduction into the analytical equipment employed. The choice of ionization method will depend on the nature of the sample and the analytical technique used, and many ionization methods are available. Mass spectrometry is a well-established analytical technique in which sample molecules are ionized and the resulting ions then sorted by mass-to-charge ratio. In one technique, the degree of deflection of the ionized particles in a magnetic field is measured, from which the relative masses of ions can be calculated. In another technique, referred to as "time of flight" (TOF) mass spectrometry, ions are accelerated in an electric field, and their velocity determined using a time measurement. The mass-to-charge ratio can be readily determined, as it is proportional to an ion's velocity. Mass spectrometry has a number of significant applications, enabling the analysis of a wide range of molecular species, from drug-like small molecules to large proteins and cellular metabolites. The ability to couple mass spectrometric analysis, particularly electrospray mass spectrometric analysis, to separation techniques, such as liquid chromatography (LC), including high performance liquid chromatography (HPLC), capillary electrophoresis, or capillary electrochromatography, has meant that complex mixtures can be separated and characterized in a single process. The technology has been applied across a wide range of disciplines and has enabled advances in areas such as drug metabolism, proteomics, metabolomics, lipidomics, and imaging.

While the application areas for mass spectrometry have increased, its basic throughput has not changed significantly over the same time frame. This is predominantly due to the requirement that samples be subjected to a separation technique prior to introduction to the mass spectrometer to isolate analytes of interest from signal-suppressing matrix components. Improvements in HPLC system design, such as reductions in dead volumes and an increase in pumping pressure, have enabled the benefits of smaller columns containing smaller particles, improved separation, and faster run time to be realized. Despite these improvements, the time required for sample separation is still around one minute. Even if real separation is not required, the mechanics of loading samples into the mass spectrometer still limit sample loading time to about ten seconds per sample.

There has been some success in improving throughput performance. Simplifying sample processing by using solid-phase extraction, rather than traditional chromatography, to remove salts can reduce pre-injection times to under ten seconds per sample from the minutes per sample required for HPLC. However, the increase in sampling speed comes at the cost of sensitivity. Furthermore, the time saved by the increase in sampling speed is offset by the need for cleanup between samples. Processing samples in parallel using multiplexed chromatography systems can increase throughput, but the complexity of this approach can negatively impact system reliability and often preclude its use in high throughput screening (HTS) environments.

Techniques that rely on a laser to deliver ionization energy and free analytes from the sample matrix also offer some improvements in speed. In matrix-assisted laser desorption ionization (MALDI), ionization of the sample is a secondary process where laser energy is absorbed by either nanostructures in the plate surface topography or a matrix molecule. These excited molecules in turn ionize the target molecule via charge transfer. MALDI works well for peptides, small proteins, lipids, and oligonucleotides and can be performed at speeds of one second per sample but underperforms for a wide range of small molecules. A related technique, laser diode thermal desorption (LDTD), desorbs sample directly into the gas phase via a thermal pathway. However, application of LDTD in the literature has been mainly aimed at small drug-like molecules, as the thermal nature of this technique and the use of an ambient pressure chemical ionization (APCI) system make it unsuitable for both modified peptides and cellular metabolites in biochemical screening. Additionally, LDTD is slower than MALDI, requiring around ten seconds per sample.

Another limitation of current mass spectrometer loading processes is the problem of carryover between samples, which necessitates a cleaning step after each sample is loaded to avoid contamination of a subsequent sample with a residual amount of analyte in the prior sample. This requires time and adds a step to the process, complicating rather than streamlining the analysis.

Additional limitations of current mass spectrometers when used to process complex samples, such as biological fluids, are unwanted "matrix effects," phenomena that result from the presence of matrix components (e.g., natural matrix components such as cellular matrix components, or contaminants inherent in some materials such as plastics) and adversely affect detection capability, precision, and/or accuracy for the analyte of interest. One such phenomenon is matrix ionization suppression, in which the presence of matrix components reduces the extent of analyte ionization and is observed as a loss in response. See, e.g., Volmer et al. (2006) *LCGC North America* 24(5):498-510, and Bruins et al. (1999) *J. Chromatogr., A* 863:115-122.

Several of the aforementioned limitations have been addressed by using acoustic droplet ejection (ADE) to deliver small amounts of a fluid sample from individual microtiter plate wells to a mass spectrometer or other analytical device. See Sinclair et al. (2016) *Journal of Laboratory Automation* 21(1):19-26 and U.S. Pat. No. 7,405,395 to Ellson et al. (Labcyte Inc., San Jose, Calif.), both of which are incorporated by reference in their entireties. Sinclair describes the application of an ultrasonic pulse to a well containing a sample of interest, generating a mist of tiny droplets that are ionized via application of an electric field and transported via a heated transport tube into a mass spectrometer. Use of the ADE process and equipment (Labcyte's Echo® 555, modified to couple to the input end of a mass spectrometer) was established to generate a signal from as little as three nanoliters of sample and enable the acquisition of over 10,000 data points per hour. While the sensitivity and speed of the ADE-based process were significant, and capable of supporting high-throughput screening, $IC_{50}$ determination, and kinetic studies, some limitations remained. In particular, as noted by Sinclair et al., potential matrix effects can still be problematic. Additionally, for applications in which a consistent droplet size is necessary or desirable, the acoustic mist approach is less than ideal, insofar as droplets with different sizes are generated by a single acoustic burst.

An ideal system for loading a mass spectrometer or other analytical device would provide a process that is even faster than that described in Ellson et al. '395, and which would completely eliminate matrix ion suppression as well as the need for a cleaning step between sample loading events.

SUMMARY OF THE INVENTION

Accordingly, the present invention addresses the aforementioned need in the art and provides a new system and method for loading a sample into an analytical instrument such as a mass spectrometer. The invention employs an acoustic droplet ejector to eject small droplets of a fluid sample containing an analyte into the sampling tip of a continuous flow sampling probe, where the acoustically ejected droplets combine with a continuous, circulating flow stream of solvent within the probe. Fluid circulation within the probe transports the sample through the probe to an outlet that directs the analyte away from the probe in a manner suitable for transfer to an analytical instrument, such as an instrument for determining the presence, identity, concentration, and/or quantity of the analyte. When the analytical instrument is a mass spectrometer or other type of device requiring the analyte to be in ionized form, the exiting droplets pass through an ionization region where an ionizing source converts neutral analyte species to ions prior to or upon entry into the analytical instrument.

In one aspect, the invention provides an acoustic droplet ejection system for transporting an analyte in a fluid sample to an analytical instrument, comprising:

(a) a reservoir housing a fluid sample containing an analyte, the fluid sample having a fluid surface;

(b) an acoustic droplet ejector for generating acoustic radiation in a manner effective to eject a droplet of the fluid sample from the fluid surface; and (c) a continuous flow sampling probe spaced apart from the fluid surface, comprising (i) a sampling tip for receiving the ejected droplet of the fluid sample, (ii) a solvent inlet for receiving a solvent from a solvent source, (iii) a solvent transport capillary for transporting the solvent from the solvent inlet to the sampling tip, where the ejected droplet combines with the solvent to form an analyte-solvent dilution, (iv) a sample outlet through which the analyte-solvent dilution is directed away from the sampling probe to an analytical instrument, and (v) a sample transport capillary for transporting the analyte-solvent dilution from the sampling tip to the sample outlet, wherein the sample transport capillary and the solvent transport capillary are in fluid communication at the sampling tip.

In another aspect of the invention, the continuous flow sampling probe of the aforementioned system comprises an outer capillary tube and an inner capillary tube co-axially disposed therein, the outer capillary tube and inner capillary tube defining the solvent transport capillary between the inner and outer capillary tubes and the sample transport capillary within the inner capillary tube.

In another aspect of the invention, the system comprises a plurality of reservoirs each housing a fluid sample containing an analyte, wherein any one of the fluid samples may be the same or different as another of the fluid samples. The reservoirs may be arranged in an array and/or be contained within a substrate that serves as an integrated multiple reservoir unit, e.g., a rack or well plate.

In another aspect of the invention, the system includes a means for positioning the ejector in acoustic coupling relationship with respect to each reservoir in the plurality of reservoirs, preferably in rapid succession, to enable high-throughput analysis.

In another aspect of the invention, the system includes a means for altering the spatial relationship of the substrate with respect to the sampling tip.

In a further aspect of the invention, the system includes: (a) a solvent pump operably connected to and in fluid communication with the solvent inlet, for controlling solvent flow rate within the solvent transport capillary from the solvent inlet to the sampling tip; and (b) a means for controlling the sample flow rate, i.e., the flow rate of the analyte-solvent dilution in the transport capillary, in which the analyte-solvent dilution is transported from the sampling tip toward the sample outlet. The means for controlling the sample flow rate may be a gas pressure regulator operably connected to a gas inlet to control the flow of a nebulizing gas to the sample outlet of the sample transport capillary that causes aspiration of the analyte-solvent dilution as it leaves the sample outlet. In a preferred embodiment, the sample outlet is configured as an electrospray tip for use in mass spectrometry.

In still a further aspect of the invention, the system additionally includes an ionization source for ionizing analyte in the analyte-solvent dilution exiting the outlet.

In another aspect, the invention provides a method for transporting a fluid sample containing an analyte to an analytical instrument, where the method comprises:

(a) acoustically coupling an acoustic droplet ejector that generates acoustic radiation to a reservoir containing the fluid sample having a fluid surface;

(b) activating the acoustic ejector to generate acoustic radiation toward the reservoir and into the fluid sample in a manner effective to eject a droplet of the fluid sample from the fluid surface into a sampling tip of a continuous flow sampling probe, where the ejected droplet combines with a circulating solvent within the flow probe to form an analyte-solvent dilution, said sampling probe spaced apart from the fluid surface to provide a gap between the fluid surface and the sampling tip; and (c) transporting the received fluid sample droplet in a solvent through a sample transport capillary within the sampling probe to a sample outlet, where the analyte-solvent dilution is directed away from the sampling probe to an analytical instrument.

In another aspect of the invention, the continuous flow sampling probe used in the aforementioned method comprises an outer capillary tube and an inner capillary tube co-axially disposed therein, the outer capillary tube and inner capillary tube defining a solvent transport capillary between the inner and outer capillary tubes and the sample transport capillary within the inner capillary tube. The solvent transport capillary and the sample transport capillary are in fluid communication at the sampling tip of the flow probe.

In an additional aspect of the invention, the continuous flow sampling probe used in the aforementioned method includes a solvent inlet for receiving the solvent from a solvent source, and a gas inlet for transporting a nebulizing gas from a gas source to the sample outlet to enable aspiration of the analyte-solvent dilution at the sample outlet. The solvent flow rate into and through the solvent transport capillary is controlled with a pump connected to and in fluid communication with the solvent inlet, while the sample transport flow rate, i.e., the flow rate of the analyte-sample dilution from the sampling tip toward the sample outlet, is controlled with a gas pressure regulator operably connected to the gas inlet, where a higher gas pressure results in a greater sample transport rate.

In still another aspect of the invention, the method comprises adjusting the solvent flow rate relative to the sample flow rate to provide a desired flow pattern, e.g., a vortex, at the sampling tip where the solvent transport capillary and the sample transport capillary are in fluid communication.

In acoustic ejection, an acoustic ejector directs focused acoustic energy into a reservoir containing a fluid sample in a manner that results in the ejection of discrete fluid droplets from the fluid surface. Acoustic ejection provides many advantages over other droplet generation methodologies. For instance, acoustic fluid ejection devices are not subject to clogging, misdirected fluid, or improperly sized droplets, and acoustic technology does not require the use of tubing or any invasive mechanical action. Acoustic ejection technology as described, for example, in U.S. Pat. No. 6,802,593 to Ellson et al., enables rapid sample processing and generation of droplets in the nanoliter or even picoliter range. In addition, acoustic ejection enables control over droplet size as well as repeated generation of consistently sized droplets. See U.S. Pat. No. 6,416,164 to Stearns et al., incorporated by reference herein. As explained in that patent, the size of acoustically ejected droplets from a fluid surface can be carefully controlled by varying the acoustic power, the acoustic frequency, the toneburst duration, and/or the F-number of the focusing lens.

The invention achieves numerous advantages over prior methods and systems for loading fluid samples into an analytical device such as a mass spectrometer. The use of ADE to eject sample droplets into the sampling interface of a continuous flow sampling probe, as provided herein, enables accurate and precise transfer of ultra-monodisperse nanoliter-sized droplets at a high repetition rate, on the order of 250 Hz, or higher, when the droplets are acoustically ejected in succession from the same fluid reservoir. This allows for "injection" of a known but variable volume of a fluid sample into the system for analysis. In addition, the present system can be adapted to provide for a very rapid transition between reservoirs, in turn enabling extremely rapid high throughput sample processing; use in conjunction with high molecular weight analytes, such as peptides and proteins; minimal or no carryover, as ADE transfer is touchless and the flow probe is self-cleaning; matrix independence, as analyte diffusion and mixing in the flow probe solvent eliminates matrix suppression issues at the single droplet level, even when the sample is undiluted plasma; quantitation with excellent dynamic range, linearity, limit of detection, and limit of quantitation; and kinetic measurements in real time by sampling a single source well over time at single-drop resolution using a high repetition rate droplet stream. In a preferred embodiment, the invention makes use of active flow control, by applying process control principles to actively manage the fluid interface at the probe sampling tip and thereby optimize conditions for sample loading and analysis as will be explained infra.

BRIEF DESCRIPTION OF THE DRAWINGS

FIGS. 4A-1, 4A-2, 4B, 4C, 4D, 4E, 4F & 4G provides mass spectra obtained using the flow probe operating in pendant drop mode, as described in Example 2.

FIGS. 5A, 5B, 5C, 5D, 5E, 5F & 5G provides mass spectra obtained using the flow probe operating in vortex mode, as described in Example 3.

FIGS. 7A-1, 7A-2, 7B-1 AND 7B-2 provide mass spectra illustrating the results of an experiment evaluating the effect on MS peaks of the number of droplets ejected at one time (i.e., in rapid succession), with the flow probe operating in vortex mode, also as described in Example 3.

FIGS. 9A-1, 9A-2, 9B-1, 9B-2, 9C, 9D-1 & 9D-2 provides the results of an analogous experiment using 1 droplet of an analyte-containing fluid sample (100 nM reserpine in 50:50 methanol:$H_2O$ and subsequently in 90% digested plasma) and 10 droplets of the same analyte-containing fluid sample, also as described in Example 4.

DETAILED DESCRIPTION OF THE INVENTION

Figures 1A, 1B:
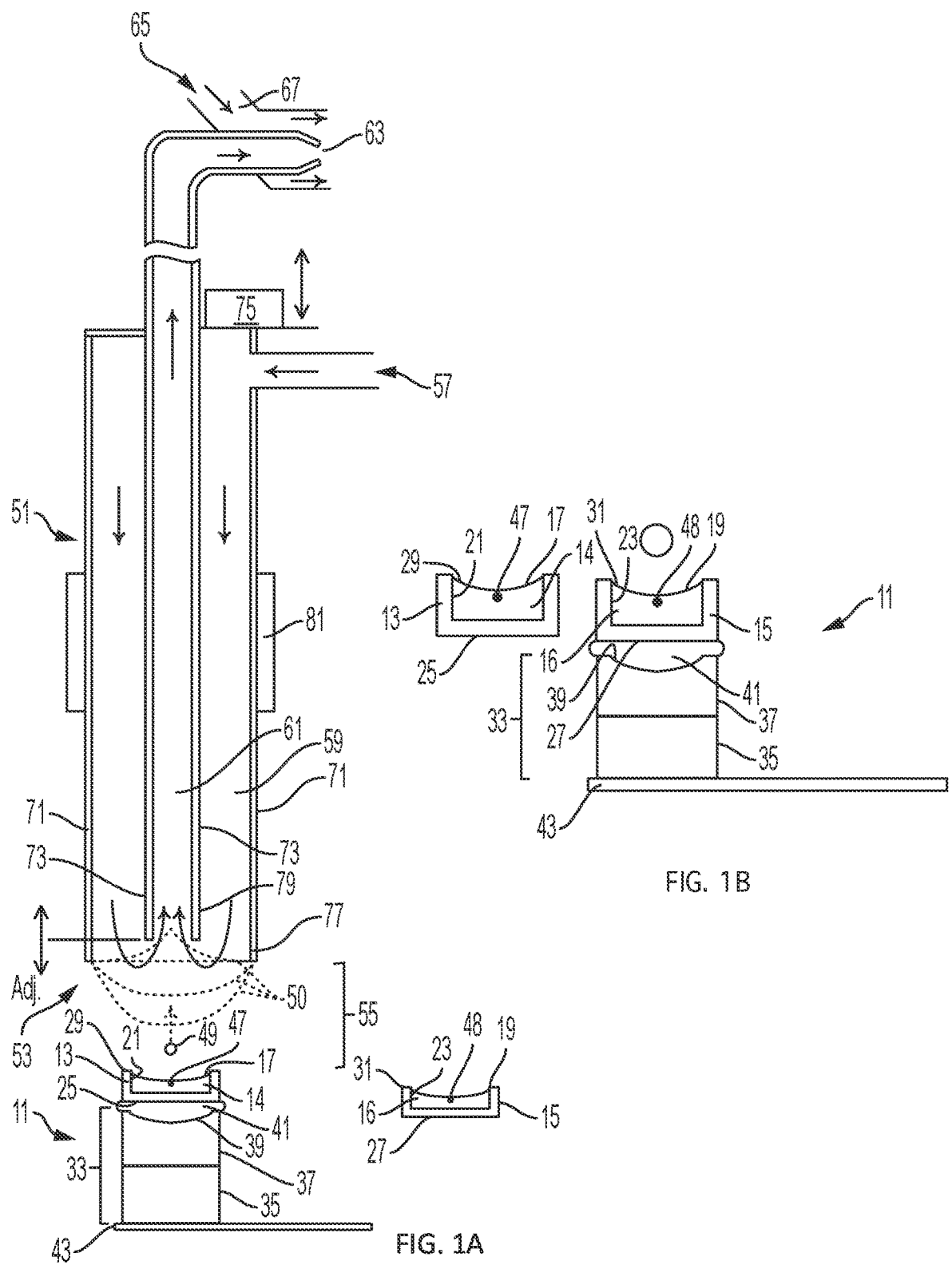
FIG. 1A schematically illustrates the present system for the acoustic loading of an analytical instrument using a continuous flow sampling probe.
FIG. 1B illustrates the embodiment in which the acoustic ejector has been repositioned to a second fluid reservoir, and FIG. 1C schematically illustrates an array of fluid reservoirs.

Unless defined otherwise, all technical and scientific terms used herein have the meaning commonly understood by one of ordinary skill in the art to which the invention pertains. Specific terminology of particular importance to the description of the present invention is defined below.

In this specification and the appended claims, the singular forms "a," "an" and "the" include plural referents unless the context clearly dictates otherwise. Thus, for example, "an analyte" refers not only to a single analyte but also to a combination of two or more different analytes, "a substitute component" refers to a single such component or to a plurality (e.g., a mixture) of components, and the like.

The term "radiation" is used in its ordinary sense and refers to emission and propagation of energy in the form of a waveform disturbance traveling through a medium such that energy is transferred from one particle of the medium to another without causing any permanent displacement of the medium itself. The radiation employed in the context of the invention is acoustic radiation.

The terms "acoustic radiation" and "acoustic energy" are used interchangeably herein and refer to the emission and propagation of energy in the form of sound waves. As with other waveforms, acoustic radiation may be focused using a focusing means, as discussed below.

The terms "focusing means" and "acoustic focusing means" refer to a means for causing acoustic waves to converge at a focal point, either by a device separate from the acoustic energy source that acts like a lens, or by the spatial arrangement of acoustic energy sources to effect convergence of acoustic energy at a focal point by constructive and destructive interference. A focusing means may be as simple as a solid member having a curved surface, or it may include complex structures such as those found in Fresnel lenses, which employ diffraction in order to direct acoustic radiation. Suitable focusing means also include phased array methods as are known in the art and described, for example, in U.S. Pat. No. 5,798,779 to Nakayasu et al. and Amemiya et al. (1997) *Proceedings of the* 1997 *IS&T NIP*13 *International Conference on Digital Printing Technologies*, pp. 698-702.

The terms "acoustic coupling" and "acoustically coupled" used herein refer to a state wherein an object is placed in direct or indirect contact with another object so as to allow acoustic radiation to be transferred between the objects without substantial loss of acoustic energy. When two items are indirectly acoustically coupled, an "acoustic coupling medium" is needed to provide an intermediary through which acoustic radiation may be transmitted. Thus, an ejector may be acoustically coupled to a fluid, e.g., by immersing the ejector in the fluid or by interposing an acoustic coupling medium between the ejector and the fluid to transfer acoustic radiation generated by the ejector through the acoustic coupling medium and into the fluid.

The term "reservoir" as used herein refers to a receptacle, chamber, or surface region for holding or containing a fluid. Thus, a fluid in a reservoir necessarily has a free surface, i.e., a surface that allows a droplet to be ejected therefrom. In its one of its simplest forms, a reservoir may be a location on a solid surface that has sufficient wetting properties to hold a fluid within a localized region solely as a result of contact between the fluid and the surface, wherein the localized region serves as a reservoir.

The term "fluid" as used herein refers to matter that is nonsolid or at least partially gaseous and/or liquid. A fluid may contain a solid that is minimally, partially or fully solvated, dispersed or suspended. Examples of fluids include, without limitation, aqueous liquids (including water per se and salt water) and nonaqueous liquids such as organic solvents and the like. The fluid may be a biological sample fluid in which the analyte of interest is just one component of many.

The term "capillary tube" referring to, for example, an inner capillary tube and an outer capillary tube, is intended to indicate a generally tube-shaped structure, i.e., a structure that is elongated and hollow, with first and second ends that may be open, closed, or connected to other structures within the present system. A "tube" as the term is used herein is not necessarily a perfect cylinder, and may, therefore, vary in diameter or wall thickness along the length of the tube. Non-cylindrical structures that can serve the same function as a tube are also envisioned (such as conical or rectangular structures).

Similarly, the term "co-axial" is used to refer to an inner capillary tube and an outer capillary tube that are approximately co-axial and not necessarily exactly co-axial, providing that there is a gap between the inner tube and the outer tube along the length of the nested tubular structure.

The term "tube" when used in a context unrelated to capillary tubes refers to a single container that is capable of housing a fluid and that may or may not be conventionally tube shaped.

The term "gap" refers to the space between the surface of a fluid sample in a reservoir and the sampling tip of the flow probe that is closest to the fluid surface. The gap comprises a region that is nonsolid and nonliquid, and may, for example, be an air gap or a gap containing an inert gas or the like. The gap can be as small as a few droplet diameters, or it may be significantly larger, insofar as droplets can travel upwards quite far relative to their size. For 2.5 nL droplets, for instance, the gap may range from about 300 μm to about 30 mm, about 200 times the droplet diameter.

The term "moiety" as used herein refers to any particular composition of matter, e.g., a molecular fragment, an intact molecule (including a monomeric molecule, an oligomeric molecule, or a polymer), or a mixture of materials (for example, an alloy or a laminate).

The term "near" as used herein refers to the distance from the focal point of the focused acoustic radiation to the surface of the fluid from which a droplet is to be ejected and indicates that the distance should be such that the focused acoustic radiation directed into the fluid results in droplet ejection from the fluid surface so that one of ordinary skill in the art will be able to select an appropriate distance for any given fluid using straightforward and routine experimentation. Generally, however, a suitable distance between the focal point of the acoustic radiation and the fluid surface is in the range of about 1 to about 15 times the wavelength of the speed of sound in the fluid, more typically in the range of about 1 to about 10 times that wavelength, preferably in the range of about 1 to about 5 times that wavelength.

The term "substantially" as in, for example, the phrase "substantially identical reservoirs" refers to reservoirs that do not materially deviate in acoustic properties. For example, acoustic attenuations of "substantially identical reservoirs" deviate by not more than 10%, preferably not more than 5%, more preferably not more than 1%, and most preferably at most 0.1% from each other. Other uses of the term "substantially" involve an analogous definition.

The "analyte" in the fluid sample may be any analyte of interest. Examples of analytes include, without limitation, drugs, metabolites, inhibitors, ligands, receptors, catalysts, synthetic polymers, and allosteric effectors. Often, the analyte is a "biomolecule," also referred to herein as a "biological molecule," i.e., any organic molecule, whether naturally occurring, recombinantly produced, chemically synthesized in whole or in part, or chemically or biologically modified, that is, was or can be a part of a living organism. The term encompasses, for example, nucleotidic analytes, peptidic analytes, and saccharidic analytes.

Nucleotidic analytes may be nucleosides or nucleotides per se, but may also comprise nucleosides and nucleotides containing not only the conventional purine and pyrimidine bases, i.e., adenine (A), thymine (T), cytosine (C), guanine (G) and uracil (U), but also protected forms thereof, e.g., wherein the base is protected with a protecting group such as acetyl, difluoroacetyl, trifluoroacetyl, isobutyryl or benzoyl, and purine and pyrimidine analogs. Suitable analogs will be known to those skilled in the art and are described in the pertinent texts and literature. Common analogs include, but are not limited to, 1-methyladenine, 2-methyladenine, $N^6$-methyladenine, $N^6$-isopentyl-adenine, 2-methylthio-$N^6$-isopentyladenine, N,N-dimethyladenine, 8-bromoadenine, 2-thiocytosine, 3-methylcytosine, 5-methylcytosine, 5-ethylcytosine, 4-acetylcytosine, 1-methylguanine, 2-methylguanine, 7-methylguanine, 2,2-dimethylguanine, 8-bromoguanine, 8-chloroguanine, 8-aminoguanine, 8-methylguanine, 8-thioguanine, 5-fluoro-uracil, 5-bromouracil, 5-chlorouracil, 5-iodouracil, 5-ethyluracil, 5-propyluracil, 5-methoxyuracil, 5-hydroxymethyluracil, 5-(carboxyhydroxymethyl)uracil, 5-(methyl-aminomethyl)uracil, 5-(carboxymethylaminomethyl)-uracil, 2-thiouracil, 5-methyl-2-thiouracil, 5-(2-bromovinyl)uracil, uracil-5-oxyacetic acid, uracil-5-oxyacetic acid methyl ester, pseudouracil, 1-methylpseudouracil, queosine, inosine, 1-methylinosine, hypoxanthine, xanthine, 2-aminopurine, 6-hydroxyaminopurine, 6-thiopurine and 2,6-diaminopurine. In addition, the terms "nucleoside" and "nucleotide" include those moieties that contain not only conventional ribose and deoxyribose sugars, but other sugars as well. Modified nucleosides or nucleotides also include modifications on the sugar moiety, e.g., wherein one or more of the hydroxyl groups are replaced with halogen atoms or aliphatic groups, or are functionalized as ethers, amines, or the like.

Nucleotidic analytes also include oligonucleotides, wherein the term "oligonucleotide," for purposes of the present invention, is generic to polydeoxyribo-nucleotides (containing 2-deoxy-D-ribose), to polyribonucleotides (containing D-ribose), to any other type of polynucleotide which is an N-glycoside of a purine or pyrimidine base, and to other polymers containing nonnucleotidic backbones. Thus, an oligonucleotide analyte herein may include oligonucleotide modifications, for example, substitution of one or more of the naturally occurring nucleotides with an analog, internucleotide modifications such as, for example, those with uncharged linkages (e.g., methyl phosphonates, phosphotriesters, phosphoramidates, carbamates, etc.), with negatively charged linkages (e.g., phosphorothioates, phosphorodithioates, etc.), and with positively charged linkages (e.g., aminoalkyl phosphoramidates and aminoalkyl phosphotriesters), those containing pendant moieties, such as, for example, proteins (including nucleases, toxins, antibodies, signal peptides, poly-L-lysine, etc.), those with intercalators (e.g., acridine, psoralen, etc.), those containing chelators (e.g., metals, radioactive metals, boron, oxidative metals, etc.). There is no intended distinction in length between the terms "polynucleotide" and "oligonucleotide," and these terms are used interchangeably. These terms refer only to the primary structure of the molecule. As used herein the symbols for nucleotides and polynucleotides are according to the IUPAC-IUB Commission of Biochemical Nomenclature recommendations (Biochemistry 9:4022, 1970).

"Peptidic" or "peptide" analytes are intended to include any structure comprised of one or more amino acids, and thus include peptides, dipeptides, oligopeptides, polypeptides, and proteins. The amino acids forming all or a part of a peptidic analyte may be any of the twenty conventional, naturally occurring amino acids, i.e., alanine (A), cysteine (C), aspartic acid (D), glutamic acid (E), phenylalanine (F), glycine (G), histidine (H), isoleucine (I), lysine (K), leucine (L), methionine (M), asparagine (N), proline (P), glutamine (Q), arginine (R), serine (S), threonine (T), valine (V), tryptophan (W), and tyrosine (Y), as well as non-conventional amino acids such as isomers and modifications of the conventional amino acids, e.g., D-amino acids, non-protein amino acids, post-translationally modified amino acids, enzymatically modified amino acids, β-amino acids, constructs or structures designed to mimic amino acids (e.g., α,α-disubstituted amino acids, N-alkyl amino acids, lactic acid, β-alanine, naphthylalanine, 3-pyridylalanine, 4-hydroxyproline, O-phosphoserine, N-acetylserine, N-formylmethionine, 3-methylhistidine, 5-hydroxylysine, and norleucine), and other non-conventional amino acids, as described, for example, in U.S. Pat. No. 5,679,782 to Rosenberg et al. Peptidic analytes may also contain non-peptidic backbone linkages, wherein the naturally occurring amide —CONH— linkage is replaced at one or more sites within the peptide backbone with a non-conventional linkage such as N-substituted amide, ester, thioamide, retropeptide (—NHCO—), retrothioamide (—NHCS—), sulfonamido (—SO$_2$NH—), and/or peptoid (N-substituted glycine) linkages. Accordingly, peptide analytes can include pseudopeptides and peptidomimetics. Peptide analytes can be (a) naturally occurring, (b) produced by chemical synthesis, (c) produced by recombinant DNA technology, (d) produced by biochemical or enzymatic fragmentation of larger molecules, (e) produced by methods resulting from a combination of methods (a) through (d) listed above, or (f) produced by any other means for producing peptides.

Saccharidic analytes include, without limitation, monosaccharides, disaccharides, oligosaccharides, polysaccharides, mucopolysaccharides or peptidoglycans (peptidopolysaccharides) and the like.

Reference to a sample "containing" an analyte includes both a sample known to contain an analyte, although the identity of the analyte may be unknown, and a sample suspected of containing an analyte, in which case the analytical instrument is used to detect the presence or absence of the analyte.

The term "array" as used herein refers to a two-dimensional or three-dimensional arrangement of features, such as an arrangement of reservoirs (e.g., wells in a well plate) or an arrangement of fluid droplets or molecular moieties on a substrate surface (as in an oligonucleotide or peptide array). Arrays are generally comprised of features regularly ordered in, for example, a rectilinear grid, parallel stripes, spirals, and the like, but non-ordered arrays may be advantageously used as well. An array differs from a pattern in that patterns do not necessarily contain regular and ordered features. In addition, arrays and patterns formed by the deposition of ejected droplets on a surface, as provided herein, are usually substantially invisible to the unaided human eye. Arrays typically, but do not necessarily, comprise at least about 4 to about 10,000,000 features, generally in the range of about 4 to about 1,000,000 features.

"Active flow control" refers to the application of process control principles to actively manage the fluid interface at the sampling tip of the flow probe and maintain the fluid pattern or configuration at that location (sometimes referred to herein as the "terminal flow pattern") to provide an ideal initial condition for sample introduction and delivery. Active flow control involves controlling the relative values of the solvent inflow rate and the solvent aspiration rate (in turn proportional to the gas inflow rate) during use to maintain an optimal terminal flow pattern, generally in the shape of a critical vortex or a supercritical vortex, preferably a supercritical vortex. Active flow control as used herein enables precise control of fluid volumetric flow rate within about 1 nL/min.

The term "sample introduction" refers to the acoustic ejection of a droplet into the sampling tip of the flow probe. The term is used synonymously with "sample loading." The terms also encompass the indirect "introduction" and "loading" of sample into an analytical instrument following transport through the flow probe.

A "continuous flow sampling probe" or "flow probe," as those terms are used herein, refer to a sampling probe with a self-cleaning sampling interface with substantially vertically aligned, substantially coaxial tubes, open at the sampling end (also referred to herein as an "open port" and "sampling tip"), in an arrangement that delivers solvent to the sampling tip through the tubing annulus and draws solvent into the center tube that is connected to an ionization source of a mass spectrometer or analytical instrument. Solvent is drawn into the center tube typically using nebulizing aspiration. The solvent delivery rate to the interface can be controlled to precisely balance the aspiration rate, creating a stable sampling interface.

"Laminar flow" (also referred to in the art as low Reynolds number flow, or streamline flow) occurs when a fluid flows in parallel streamlines, with no disruption between the layers. In laminar flow, the motion of the particles of the fluid is very orderly with all particles moving in straight lines parallel to the tube walls and adjacent layers slide past one another. There are no cross-currents perpendicular to the direction of flow and no eddies or swirls of fluids, and therefore no lateral mixing occurs. Laminar flow tends to occur at lower fluid velocities, below a threshold at which it becomes turbulent, defined by the Reynolds number.

The "Limit of Detection (LOD)" is the lowest quantity of a substance that can be distinguished from the absence of that substance (a blank value) within a stated confidence limit (generally 1%). The LOD is defined as 3 times the standard deviation of the blank. For a signal at the LOD, the alpha error, i.e., the probability of a false positive, is small (1%). However, the beta error, i.e., the probability of a false negative, is 50% for a sample that has a concentration at the LOD. This means a sample could contain an impurity at the LOD, but there is a 50% chance that a measurement would give a result less than the LOD.

$$LOD = S_{reag} + 3 * \sigma_{reag}$$

where $S_{reag}$ is the signal for a reagent blank and $\sigma_{reag}$ is the known standard deviation for the reagent blank's signal.

The "Limit of Quantitation (LOQ)" is the limit at which one can reasonably tell the difference between two different values. LOQ defined as 10*standard deviation of the blank. At the LOQ, there is minimal chance of a false negative.

$$LOQ = S_{reag} + 10 * \sigma_{reag}$$

where $S_{reag}$ and, $\sigma_{reag}$ are defined as above.

The "Poiseuille law" is the principle that the volume of a homogeneous fluid passing per unit time through a capillary tube is directly proportional to the pressure difference between its ends and to the fourth power of its internal radius and is inversely proportional to its length and to the viscosity of the fluid.

"Turbulent flow" refers to a flow regime characterized by chaotic property changes. The readily available supply of energy in turbulent flows tends to accelerate the homogenization of fluid mixtures. The characteristic that is responsible for the enhanced mixing and increased rates of mass, momentum and energy transport in a flow is called "diffusivity". Turbulent flows have non-zero vorticity and are characterized by a strong three-dimensional vortex generation mechanism known as vortex stretching. To sustain turbulent flow, a persistent source of energy supply is required because turbulence dissipates rapidly as the kinetic energy is converted into internal energy by viscous shear stress.

A "vortex" is a region in a fluid in which the flow is rotating around an axis line, which may be straight or curved. Vortices are a major component of turbulent flow. The distribution of velocity, vorticity (the curl of the flow velocity), as well as the concept of circulation are used to characterize vortices. In most vortices, the fluid flow velocity is greatest next to its axis and decreases in inverse proportion to the distance from the axis. In the absence of external forces, viscous friction within the fluid tends to organize the flow into a collection of irrotational regions possibly superimposed to larger-scale flows, including larger-scale vortices. Once formed, vortices can move, stretch, twist, and interact in complex ways. A moving vortex carries with it some angular and linear momentum, energy, and mass.

The present invention makes use of acoustic droplet ejection ("ADE") to transport extremely small droplets of an analyte-containing fluid, i.e., nanoliter-sized droplets, into a sampling tip of a continuous flow sampling probe, where the droplet combines with circulating solvent and is then transported, as an analyte-solvent dilution, to an outlet for subsequent transfer to an analytical instrument such as a mass spectrometer, an alternative spectroscopy device, a separation system, or the like. The analytical instrument may encompass two or more individual systems that perform different functions, e.g., a separation system and an analyte detection system such as a mass spectrometer. The system and method of the invention substantially reduce the time between samples, i.e., the time between loading a first sample and loading a subsequent sample and/or the time between successive droplet ejections from the same fluid reservoir. The invention also eliminates the need for between-sample cleanup, and significantly reduces matrix ion suppression. Numerous other advantages achieved by the invention are noted elsewhere herein and/or will be apparent to those of ordinary skill in the art.

Acoustic ejection enables rapid processing as well as generation of nanoliter-sized droplets of predetermined and consistent size; see U.S. Pat. No. 6,416,164 to Stearns et al., incorporated by reference earlier herein. The aforementioned patent describes how the size of acoustically ejected droplets from a fluid surface can be carefully controlled by varying the acoustic power, the acoustic frequency, the toneburst duration, and/or the F-number of the focusing lens, with lenses having an F-number greater than approximately 2 generally preferred. ADE thus enables ejection of "ultra-monodisperse" droplets, which in the context of the present invention means that repeated ejection of droplets from a fluid sample results in a coefficient of variation of about 1%. This in turn enables introduction of a fluid sample in a precise and predetermined amount into the system for analysis. An additional advantage of using acoustic ejection is that droplets can be ejected from a very small sample size, on the order of 5 µl or less. This is particularly advantageous when sample availability is limited, and a small fluid sample must be analyzed out of necessity. In terms of processing capability, U.S. Pat. No. 6,938,995 to Mutz et al. explains that acoustic ejection technology, used in conjunction with acoustic assessment of fluid samples in a plurality of reservoirs, can achieve analysis of over 5, 10, or even 25 reservoirs per second, translating to well in excess of 50,000 fluid samples per day.

Because of the precision that is possible using acoustic ejection technology, the present system can be used to acoustically eject sample fluid droplets of very small size. The invention is not limited in this regard, however, and the volume of acoustically ejected droplets can range from about 0.5 pL to about 3 mL. For many applications, the system of the invention is used to generate nanoliter-sized fluid droplets for analysis, where "nanoliter-sized" droplets generally contain at most about 30 nL of fluid sample, typically not more than about 10 nL, preferably not more than about 5.0 nL, more preferably not more than about 3.0 nL, such as not more than 1.0 nL, not more than about 50 pL, not more than about 25 pL, and not more than about 1 pL, including ranges of about 0.5 pL to 2.0 nL, about 0.5 pL to 1.5 nL, about 0.5 pL to 1.0 nL, about 1.0 pL to 2.0 nL, about 1.0 pL to 1.5 nL, about 1.0 pL to 1.0 nL, and the like. The typical operating range produces droplets in the range of about 1 nL to about 30 nL. Acoustic ejection of droplets from the surface of a fluid sample is carried out using an acoustic ejector as will be described in detail below. Acoustic ejection technology is particularly suited to high-throughput processing, particularly high-throughput mass spectrometry (HTMS), insofar as HTMS has been hampered by the lack of easily automated sample preparation and loading, the need to conserve sample, the need to eliminate cross contamination, the inability to go directly from a fluid reservoir into the analytical device, and the inability to generate droplets of the appropriate size.

In one embodiment, then, the system and method of the invention make use of an acoustic ejector as a fluid sample droplet generation device to eject droplets into the sampling tip of a continuous flow sampling probe. The acoustic ejector directs acoustic energy into a reservoir housing an analyte-containing fluid sample in a manner that causes ejection of a fluid droplet upward from the surface of the fluid and toward and into the sampling tip of the flow probe. The system also includes a means for positioning the reservoir and the acoustic ejector in acoustic coupling relationship. Typically, a single ejector is used that is composed of an acoustic radiation generator and a focusing means for focusing the acoustic radiation generated by the acoustic radiation generator. However, a plurality of ejectors may be advantageously used as well. Likewise, although a single reservoir may be used, the device typically includes a plurality of reservoirs, e.g., as an array. When the system is used to eject a droplet of an analyte-containing fluid sample from each of a plurality of reservoirs, a positioning means is incorporated in order to move a substrate containing the reservoirs (which may be positioned on a movable stage, for instance) relative to the acoustic ejector, or vice versa. Rapid and successive acoustic ejection of a fluid droplet from each of a series of reservoirs is thereby readily facilitated. Either type of positioning means, i.e., an ejector positioning means or a reservoir or reservoir substrate positioning means, can be constructed from, for example, motors, levers, pulleys, gears, a combination thereof, or other electromechanical or mechanical means.

While any acoustic droplet ejection system can be used in conjunction with present system and method, preferred ADE systems are those described in the following U.S. patents, all of common assignment herewith and incorporated by reference herein: U.S. Pat. No. 6,416,164 to Stearns et al.; U.S. Pat. No. 6,666,541 to Ellson et al.; U.S. Pat. No. 6,603,118 to Ellson et al.; U.S. Pat. No. 6,746,104 to Ellson et al.; U.S. Pat. No. 6,802,593 to Ellson et al.; U.S. Pat. No. 6,938,987 to Ellson et al.; U.S. Pat. No. 7,270,986 to Mutz et al.; U.S. Pat. No. 7,405,395 to Ellson et al.; and U.S. Pat. No. 7,439,048 to Mutz et al. Preferred ADE systems for use herein are those available from Labcyte Inc., particularly the Echo® 500-series Liquid Handler systems, including the Echo® 525, the Echo® 550, and the Echo® 555 Liquid Handlers, which can eject a broad range of fluid classes with high accuracy, precision and speed.

As described in the above patents, an acoustic ejection device may be constructed to eject fluid droplets from a single reservoir or from multiple reservoirs. To provide modularity and interchangeability of components, it may sometimes be preferred for the device to be used in conjunction with a plurality of removable reservoirs, e.g., tubes in a rack or the like. Generally, the reservoirs are arranged in a pattern or an array to provide each reservoir with individual systematic addressability. In addition, while each of the reservoirs may be provided as a discrete or stand-alone container, in circumstances that require a large number of reservoirs, it is preferred that the reservoirs are contained within an integrated multiple reservoir unit. As an example, the multiple reservoir unit may be a solid surface on which discrete fluid-containing regions are maintained in place by virtue of surface wetting properties, with each localized fluid-containing region constituting a reservoir. As another example, the multiple reservoir unit may be a well plate with the individual wells serving as reservoirs. Many well plates suitable for use with the device are commercially available and may contain, for example, 96, 384, 1536, or 3456 wells per well plate, and having a full skirt, half skirt, or no skirt. Well plates or microtiter plates have become commonly used laboratory items. The Society for Laboratory Automation and Screening (SLAS) has established and maintains standards for microtiter plates in conjunction with the American National Standards Institute, including the footprint and dimension standards ANSI/SLAS 1-2004. The wells of such well plates are generally in the form of rectilinear arrays.

The availability of such commercially available well plates does not preclude the manufacture and use of custom-made well plates in other geometrical configurations containing at least about 10,000 wells, or as many as 100,000 to 500,000 wells, or more. Furthermore, the material used in the construction of reservoirs must be compatible with the fluid samples contained therein. Thus, if it is intended that the reservoirs or wells contain an organic solvent such as acetonitrile, polymers that dissolve or swell in acetonitrile would be unsuitable for use in forming the reservoirs or well plates. Similarly, reservoirs or wells intended to contain DMSO must be compatible with DMSO. For water-based fluids, a number of materials are suitable for the construction of reservoirs and include, but are not limited to, ceramics such as silicon oxide and aluminum oxide, metals such as stainless steel and platinum, and polymers such as polyester, polypropylene, cyclic olefin copolymers (e.g., those available commercially as Zeonex® from Nippon Zeon and Topas® from Ticona), polystyrene, and polytetrafluoroethylene. For fluids that are photosensitive, the reservoirs may be constructed from an optically opaque material that has sufficient acoustic transparency for substantially unimpaired functioning of the device.

In addition, to reduce the amount of movement and time needed to align the acoustic radiation generator with each reservoir or reservoir well during operation, it is preferable that the center of each reservoir be located not more than about 1 centimeter, more preferably not more than about 1.5 millimeters, still more preferably not more than about 1 millimeter and optimally not more than about 0.5 millimeter, from a neighboring reservoir center. These dimensions tend to limit the size of the reservoirs to a maximum volume. The reservoirs are constructed to contain typically no more than about 1 mL, preferably no more than about 100 µL, more preferably no more than about 1 µL, and optimally no more than about 1 nL, of fluid. To facilitate handling of multiple reservoirs, it is also preferred that the reservoirs be substantially acoustically indistinguishable.

The acoustic ejection device used in conjunction with the present system and method enables the acoustic ejection of droplets at a rate of at least about 250 Hz, but higher ejection rates including 500 Hz, 1 kHz, or higher are possible, with smaller droplets enabling higher repetition rates. The device is also capable of rapidly ejecting droplets from each of a plurality of reservoirs, which may be arranged in array such as is the case with a well plate or a rack of individual tubes. That is, a substrate positioning means or an ejector positioning means acoustically couples the ejector to each of a series of fluid reservoirs in rapid succession, thereby allowing fast and controlled ejection of fluid sample droplets from different reservoirs. Current commercially available technology allows for the substrate to be moved relative to the ejector, and/or for the ejector to be moved from one reservoir to another within the same substrate, with repeatable and controlled acoustic coupling at each reservoir, in less than about 0.1 second for high performance positioning means and in less than about 1 second for ordinary positioning means. As explained in U.S. Pat. No. 6,666,541 to Ellson et al., a custom designed system can reduce the reservoir-to-reservoir transition time (equivalent to the time between acoustic ejection events) to less than about 0.001 second. In order to provide a custom designed system, it is important to keep in mind that there are two basic kinds of motion: pulse and continuous. Pulse motion involves the discrete steps of moving a substrate or an ejector into position so that the ejector is acoustically coupled to a reservoir within the substrate, acoustically ejecting a droplet from a sample fluid in the reservoir, and repositioning the substrate and/or ejector so that the ejector is acoustically coupled to the next reservoir. Using a high performance positioning means with such a method allows repeatable and controlled acoustic coupling at each reservoir in less than 0.1 second. A continuous motion design, on the other hand, moves the substrate and/or ejector continuously, although not at the same speed, and provides for ejection during movement. Since the pulse width is very short, this type of process enables over 10 Hz reservoir transitions, and even over 1000 Hz reservoir transitions.

A vibrational element or ultrasonic transducer is used to generate acoustic radiation. An ultrasonic transducer typically includes an actuator and a focusing element that concentrates acoustic energy produced by the actuator; examples of actuators include piezoelectric and magnetorestrictive elements, with piezoelectric transducers generally, although not necessarily, preferred herein. In operation, the actuator is driven by a signal at an ultrasonic driving frequency and produces ultrasonic vibrations in the active physical element. These vibrations are transmitted into and through the acoustic coupling medium and into the reservoir housing the fluid sample. Alternatively, a single transducer can be used, or in some cases, multiple element acoustic radiation generators comprising transducer assemblies may be used. For example, linear acoustic arrays, curvilinear acoustic arrays or phased acoustic arrays may be advantageously used to generate acoustic radiation that is transmitted simultaneous to a plurality of reservoirs.

A representative system of the invention is illustrated in FIG. 1A. As with all figures referenced herein, in which like parts are referenced by like numerals, FIG. 1A is not to scale, and certain dimensions are exaggerated for clarity of presentation. In FIG. 1A, the acoustic droplet ejection device is shown generally at 11, ejecting droplet 49 toward the continuous flow sampling probe (sometimes referred to hereafter as simply "flow probe") indicated generally at 51 and into the sampling tip 53 thereof.

The acoustic droplet ejection device 11 includes at least one reservoir, with a first reservoir shown at 13 and an optional second reservoir 31. In some embodiments a further plurality of reservoirs may be provided. Each reservoir is configured to house a fluid sample having a fluid surface, e.g., a first fluid sample 14 and a second fluid sample 16 having fluid surfaces respectively indicated at 17 and 19. The fluid samples 14 and 16 may be the same or different, but are generally different, insofar as they will ordinarily contain two different analytes intended to be transported to and detected in an analytical instrument (not shown). The analyte may be a biomolecule or a macromolecule other than a biomolecule, or it may be a small organic molecule, an inorganic compound, an ionized atom, or any moiety of any size, shape, or molecular structure, as explained earlier in this section. In addition, the analyte may be dissolved, suspended or dispersed in the liquid component of the fluid sample.

When more than one reservoir is used, as illustrated in FIG. 1A, the reservoirs are preferably both substantially identical and substantially acoustically indistinguishable, although identical construction is not a requirement. As explained earlier in this section, the reservoirs may be separate removable components in a tray, rack, or other such structure, but they may also be fixed within a plate, e.g., a well plate, or other substrate. Each reservoir is preferably substantially axially symmetric, as shown, having vertical walls 21 and 23 extending upward from circular reservoir bases 25 and 27, and terminating at openings 29 and 31, respectively, although other reservoir shapes and reservoir base shapes may be used. The material and thickness of each reservoir base should be such that acoustic radiation may be transmitted therethrough and into the fluid sample contained within each reservoir.

The acoustic droplet ejection device comprises acoustic ejector 33, which includes acoustic radiation generator 35 and focusing means 37 for focusing the acoustic radiation generated at a focal point 47 within the fluid sample, near the fluid surface. As shown in FIG. 1A, the focusing means 37 may comprise a single solid piece having a concave surface 39 for focusing the acoustic radiation, but the focusing means may be constructed in other ways as discussed below. The acoustic ejector 33 is thus adapted to generate and focus acoustic radiation so as to eject a droplet of fluid from each of the fluid surfaces 17 and 19 when acoustically coupled to reservoirs 13 and 15, and thus to fluids 14 and 16, respectively. The acoustic radiation generator 35 and the focusing means 37 may function as a single unit controlled by a single controller, or they may be independently controlled, depending on the desired performance of the device.

Any of a variety of focusing means that include curved surfaces or Fresnel lenses known in the art may be employed in conjunction with the present invention. Such focusing means are described in U.S. Pat. No. 4,308,547 to Lovelady et al. and U.S. Pat. No. 5,041,849 to Quate et al., as well as in U.S. Patent Application Publication No. 2002037579. In addition, there are a number of ways to acoustically couple the ejector to each individual reservoir and thus to the fluid therein. Although acoustic coupling can be achieved through direct contact with the fluid contained in the reservoirs, the preferred approach is to acoustically couple the ejector to the reservoirs and reservoir fluids without allowing any portion of the ejector (e.g., the focusing means) to contact any of the fluids to be ejected.

The acoustic droplet ejector 33 may be in either direct contact or indirect contact with the external surface of each reservoir. With direct contact, in order to acoustically couple the ejector to a reservoir, it is preferred that the direct contact be wholly conformal to ensure efficient acoustic energy transfer. That is, the ejector and the reservoir should have corresponding surfaces adapted for mating contact. Thus, if acoustic coupling is achieved between the ejector and reservoir through the focusing means, it is desirable for the reservoir to have an outside surface that corresponds to the surface profile of the focusing means. Without conformal contact, efficiency and accuracy of acoustic energy transfer may be compromised. In addition, since many focusing means have a curved surface, the direct contact approach may necessitate the use of reservoirs that have a specially formed inverse surface.

Optimally, acoustic coupling is achieved between the ejector and each of the reservoirs through indirect contact, as illustrated in FIG. 1A. In the figure, an acoustic coupling medium 41 is placed between the ejector 33 and the base 25 of reservoir 13, with the ejector and reservoir located at a predetermined distance from each other. The acoustic coupling medium may be an acoustic coupling fluid, preferably an acoustically homogeneous material in conformal contact with both the acoustic focusing means 37 and the underside of the reservoir. In addition, it is important to ensure that the fluid medium is substantially free of material having different acoustic properties than the fluid medium itself. As shown, the first reservoir 13 is acoustically coupled to the acoustic focusing means 37 such that an acoustic wave generated by the acoustic radiation generator is directed by the focusing means 37 into the acoustic coupling medium 41, which then transmits the acoustic radiation into the reservoir 13. An ejector positioning means 43 is shown below reservoir 13 for repositioning the ejector with respect to a second reservoir, illustrated at 15 in the figure. FIG. 1B also shows that the ejector 33 has been repositioned by the ejector positioning means 43 below reservoir 15 and in acoustically coupled relationship thereto by virtue of acoustic coupling medium 41. The system may contain a single acoustic ejector, as illustrated in FIG. 1A, or, as noted previously, it may contain multiple ejectors. Single ejector designs are generally preferred over multiple ejector designs because accuracy of droplet placement and consistency in droplet size and velocity are more easily achieved with a single ejector. However, the invention is not limited to single ejector designs.

Figure 1C:
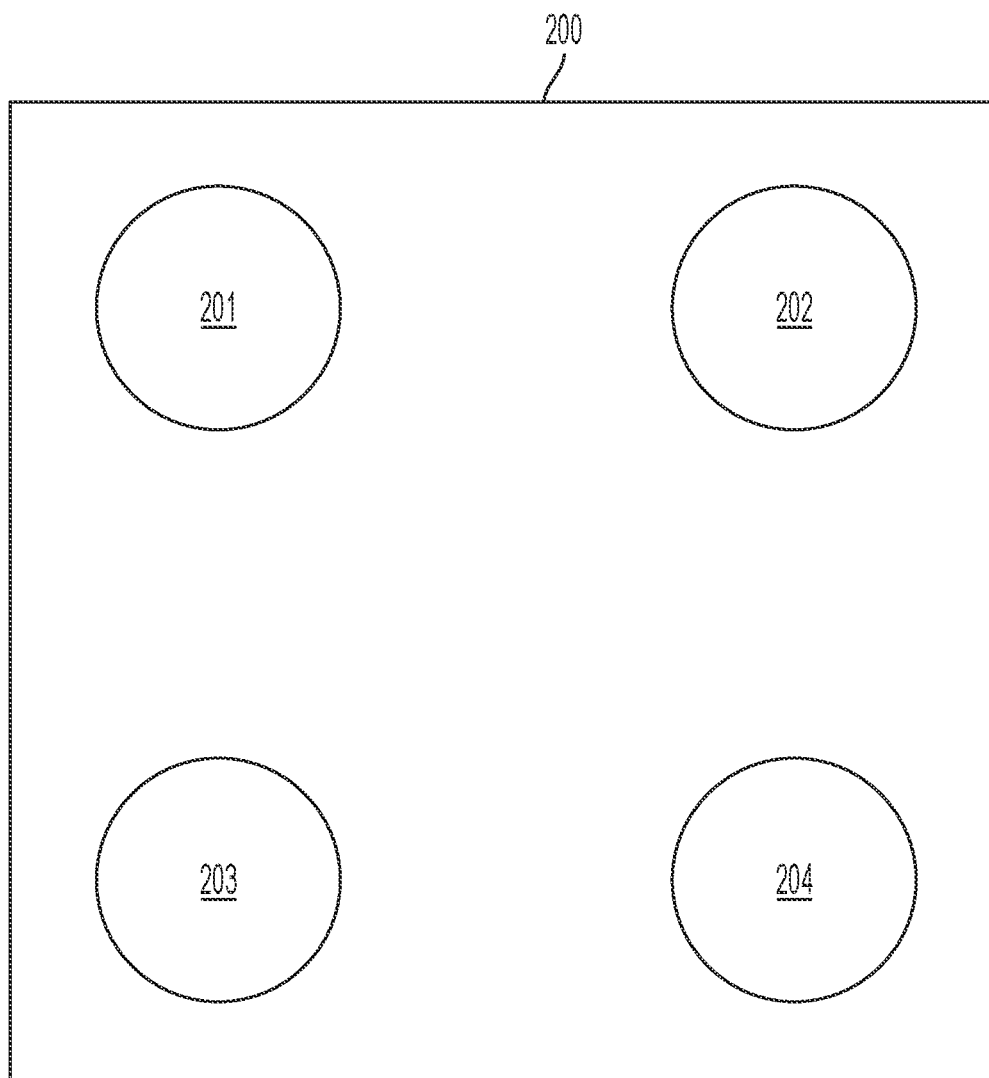
Figure 1D:
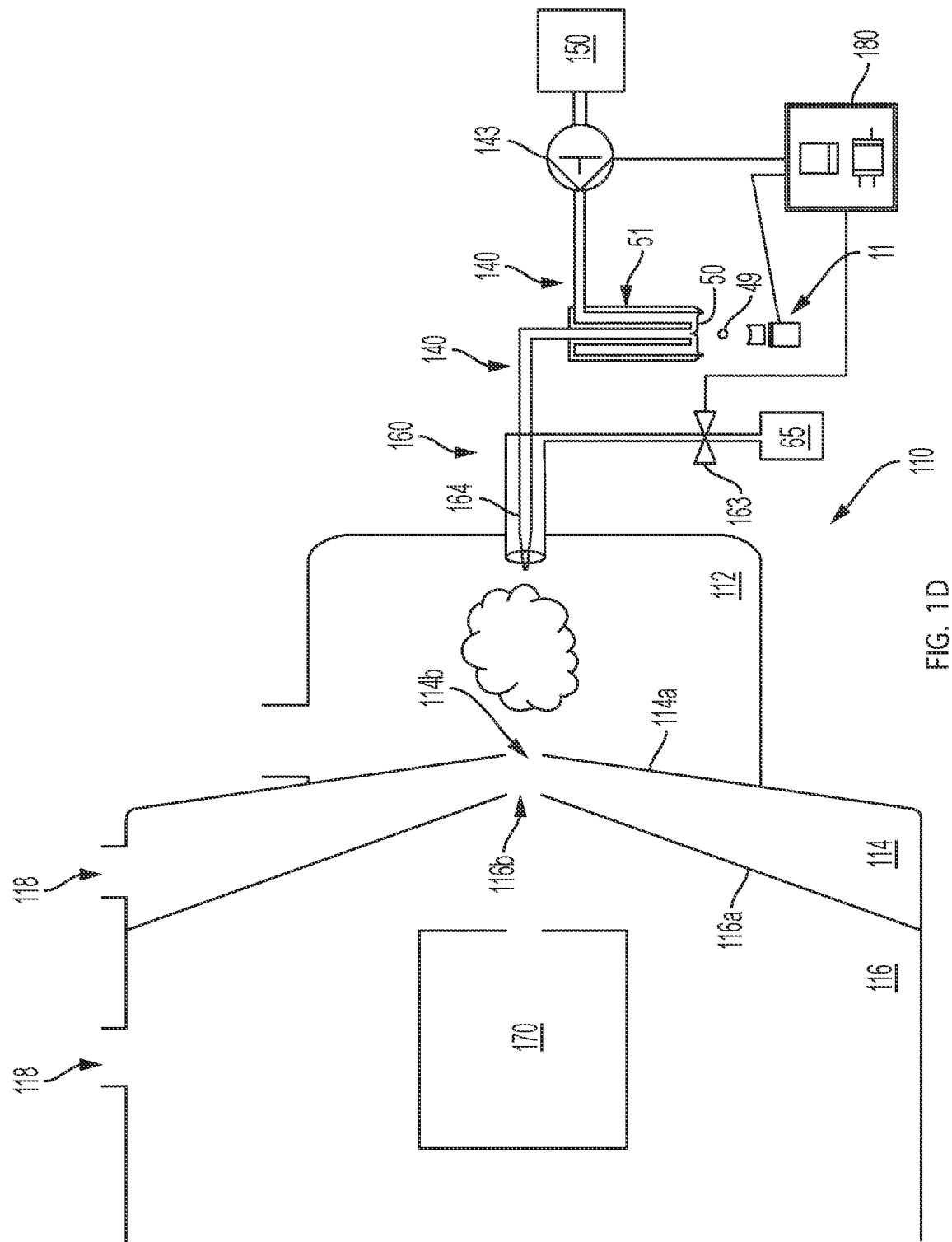
FIG. 1D schematically illustrates an exemplary system comprising a sampling probe associated with an acoustic droplet ejection system and interfaced with an electrospray ion source of a mass spectrometer system in accordance with various aspects of the applicant's teachings.

In operation, reservoir 13 and optional reservoir 15 of the device are filled with first and second fluid samples 14 and 16, respectively, as shown in FIG. 1A. The acoustic ejector 33 is positioned just below reservoir 13, with acoustic coupling between the ejector and the reservoir provided by means of acoustic coupling medium 41. Initially, the acoustic ejector is positioned directly below sampling tip 53 of flow probe 51, such that the sampling tip faces the surface 17 of the fluid sample 14 in the reservoir 13. Once the ejector 33 and reservoir 13 are in proper alignment below sampling tip 53, the acoustic radiation generator 35 is activated to produce acoustic radiation that is directed by the focusing means 37 to a focal point 47 near the fluid surface 17 of the first reservoir. As a result, droplet 49 is ejected from the fluid surface 17 toward and into the liquid boundary 50 at the sampling tip 53 of the flow probe 51, where it combines with solvent in the flow probe 53. The profile of the liquid boundary 50 at the sampling tip 53 may vary from extending beyond the sampling tip 53 to projecting inward into the probe 51, as described in more detail below in relation to FIG. 2. In a multiple-reservoir system, the reservoir unit schematically illustrated at 200 in FIG. 1C with reservoirs indicated at 201, 202, 203, and 204, e.g., a multi-well plate or tube rack, can then be repositioned relative to the acoustic ejector such that another reservoir is brought into alignment with the ejector and a droplet of the next fluid sample can be ejected. The solvent in the flow probe cycles through the probe continuously, minimizing or even eliminating "carry-over" between droplet ejection events.

Fluid samples 14 and 16 are samples of any fluid for which transfer to an analytical instrument is desired, where the term "fluid" is as defined earlier herein. Accordingly, the fluid sample may contain a solid that is minimally, partially or fully solvated, dispersed, or suspended in a liquid, which may be an aqueous liquid or a nonaqueous liquid. In one aspect of the invention, the fluid sample is a biological fluid sample, where the "biological sample" of the biological fluid sample refers to (1) a biological material obtained from a subject, such as tissue, tissue homogenate, cells, cell suspensions, cell extract, whole blood, plasma, serum, saliva, sputum, nasal discharge, cerebrospinal fluid, interstitial fluid, lymph fluid, semen, vaginal fluid, feces, etc., which may or may not be combined with one or more additional materials such as a solvent, reagent, stabilizing agent, culture medium, or the like, or which may or may not have been processed in some way, e.g., using one or more of the aforementioned materials; (2) a biological entity such as a bacterium, virus, fungus, protozoan, etc.; (3) any material containing a biological entity such as a bacterium, virus, fungus, protozoan, etc.; or (4) a fluid containing a biological molecule where that term is defined earlier herein. Each fluid sample is either a control sample, a fluid containing one or more analytes of interest, or a fluid suspected of containing one or more analytes of interest.

The structure of flow probe 51 is also shown in FIG. 1A. Any number of commercially available continuous flow sampling probes can be used as is or in modified form, all of which, as is well known in the art, operate according to substantially the same principles. As can be seen in the FIG. 1A, the sampling tip 53 of flow probe 51 is spaced apart from the fluid surface 17 in the reservoir 13, with a gap 55 therebetween. The gap 55 may be an air gap, or a gap of an inert gas, or it may comprise some other gaseous material; there is no liquid bridge connecting the sampling tip 53 to the fluid 14 in the reservoir 13. The flow probe 51 includes a solvent inlet 57 for receiving solvent from a solvent source and a solvent transport capillary 59 for transporting the solvent flow from the solvent inlet 57 to the sampling tip 53, where the ejected droplet 49 of analyte-containing fluid sample 14 combines with the solvent to form an analyte-solvent dilution. A solvent pump (not shown) is operably connected to and in fluid communication with solvent inlet 57 in order to control the rate of solvent flow into the solvent transport capillary and thus the rate of solvent flow within the solvent transport capillary 59 as well.

Fluid flow within the probe 53 carries the analyte-solvent dilution through a sample transport capillary 61 provided by inner capillary tube 73 toward sample outlet 63 for subsequent transfer to an analytical instrument. A sampling pump (not shown) can be provided that is operably connected to and in fluid communication with the sample transport capillary 61, to control the output rate from outlet 63. Suitable solvent pumps and sampling pumps will be known to those of ordinary skill in the art, and include displacement pumps, velocity pumps, buoyancy pumps, syringe pumps, and the like; other examples are given in U.S. Pat. No. 9,395,278 to Van Berkel et al., the disclosure of which is incorporated by reference herein. In a preferred embodiment, a positive displacement pump is used as the solvent pump, e.g., a peristaltic pump, and, instead of a sampling pump, an aspirating nebulization system is used so that the analyte-solvent dilution is drawn out of the sample outlet 63 by the Venturi effect caused by the flow of the nebulizing gas introduced from a nebulizing gas source 65 via gas inlet 67 (shown in simplified form in FIG. 1A, insofar as the features of aspirating nebulizers are well known in the art) as it flows over the outside of the sample outlet 63. The analyte-solvent dilution flow is then drawn upward through the sample transport capillary 61 by the pressure drop generated as the nebulizing gas passes over the sample outlet 63 and combines with the fluid exiting the sample transport capillary 61. A gas pressure regulator is used to control the rate of gas flow into the system via gas inlet 67. In a preferred manner, the nebulizing gas flows over the outside of the sample transport capillary 61 at or near the sample outlet 63 in a sheath flow type manner which draws the analyte-solvent dilution through the sample transport capillary 61 as it flows across the sample outlet 63 that causes aspiration at the sample outlet upon mixing with the nebulizer gas.

The solvent transport capillary 59 and sample transport capillary 61 are provided by outer capillary tube 71 and inner capillary tube 73 substantially co-axially disposed therein, where the inner capillary tube 73 defines the sample transport capillary, and the annular space between the inner capillary tube 73 and outer capillary tube 71 defines the solvent transport capillary 59. The dimensions of the inner capillary tube 73 can be from 1 micron to 1 mm, e.g., 200 microns. Typical dimensions of the outer diameter of the inner capillary tube 73 can be from 100 microns to 3 or 4 centimeters, e.g., 360 microns. Typical dimensions of the inner diameter of the outer capillary tube 71 can be from 100 microns to 3 or 4 centimeters, e.g., 450 microns. Typical dimensions of an outer diameter of the outer capillary tube 71 can be from 150 microns to 3 or 4 centimeters, e.g., 950 microns. The cross-sectional areas of the inner capillary tube 73 and/or the outer capillary tube 71 can be circular, elliptical, superelliptical (i.e., shaped like a superellipse), or even polygonal. While the illustrated system in FIG. 1A indicates the direction of solvent flow as downward from the solvent inlet 57 toward sampling tip 53 in the solvent transport capillary 59 and the direction of the analyte-solvent dilution flow as upward from the sampling tip 53 upward through the sample transport capillary 61 toward outlet 63, the directions can be reversed, and the flow probe 51 is not necessarily positioned to be exactly vertical. Various modifications to the structure shown in FIG. 1A will be apparent to those of ordinary skill in the art, or may be deduced by those of ordinary skill in the art during use of the system.

Figures 1, 4A:
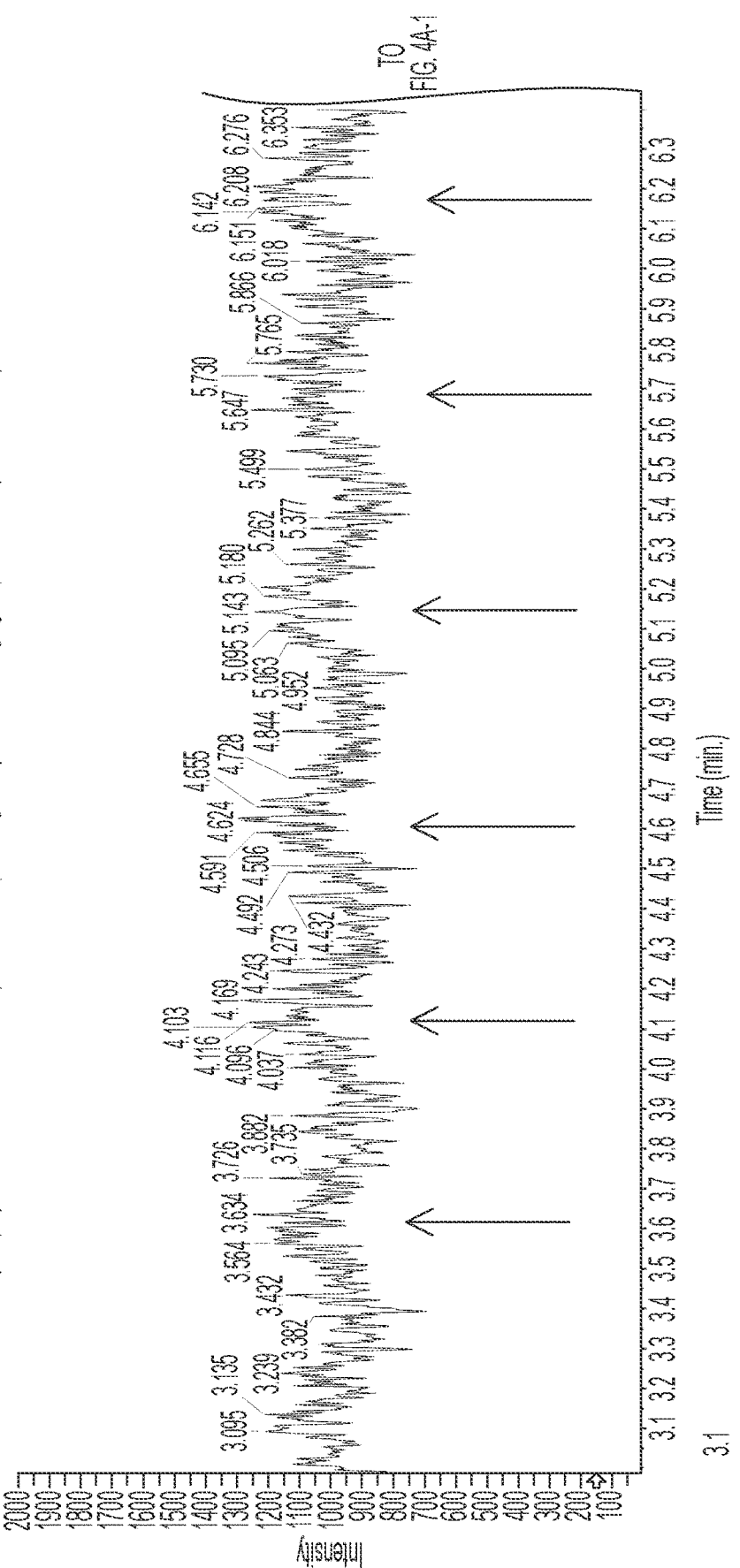
Figures 2, 4A:
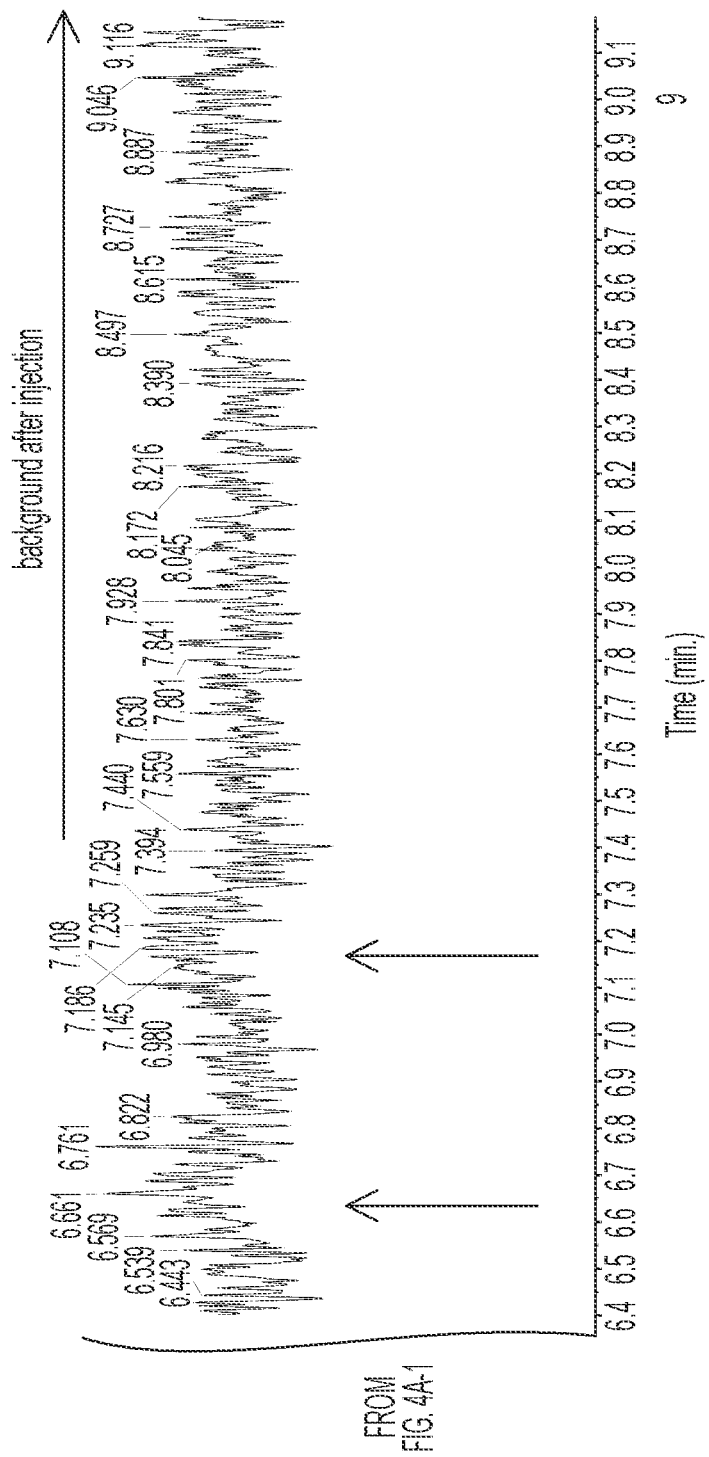

The system can also include an adjuster 75 coupled to the outer capillary tube 71 and the inner capillary tube 73. The adjuster 75 can be adapted for moving the outer capillary tube tip 77 and the inner capillary tube tip 79 longitudinally relative to one another. The adjuster 75 can be any device capable of moving the outer capillary tube 71 relative to the inner capillary tube 73. Exemplary adjusters 75 can be motors including, but are not limited to, electric motors (e.g., AC motors, DC motors, electrostatic motors, servo motors, etc.), hydraulic motors, pneumatic motors, translational stages, and combinations thereof. As used herein, "longitudinally" refers to an axis that runs the length of the probe 51, and the inner and outer capillary tubes 73, 71 can be arranged coaxially around a longitudinal axis of the probe 51, as shown in FIG. 1. Optionally, prior to use, the adjuster 75 is used to draw the inner capillary tube 73 longitudinally inward so that the outer capillary tube 71 protrudes beyond the end of the inner capillary tube 73, so as to facilitate optimal fluid communication between the solvent flow in the solvent transport capillary 59 and the sample transported as an analyte-solvent dilution flow 61 in the sample transport capillary 61.

Additionally, as illustrated in FIG. 1A, the flow probe 51 is generally affixed within an approximately cylindrical holder 81, for stability and ease of handling.

FIG. 1B schematically depicts an embodiment of an exemplary system 110 in accordance with various aspects of the applicant's teachings for ionizing and mass analyzing analytes received within an open end of a sampling probe 51, the system 110 including an acoustic droplet injection device 11 configured to inject a droplet 49, from a reservoir into the open end of the sampling probe 51. As shown in FIG. 1B, the exemplary system 110 generally includes a sampling probe 51 (e.g., an open port probe) in fluid communication with a nebulizer-assisted ion source 160 for discharging a liquid containing one or more sample analytes (e.g., via electrospray electrode 164) into an ionization chamber 112, and a mass analyzer 170 in fluid communication with the ionization chamber 112 for downstream processing and/or detection of ions generated by the ion source 160. A fluid handling system 140 (e.g., including one or more pumps 143 and one or more conduits) provides for the flow of liquid from a solvent reservoir 150 to the sampling probe 51 and from the sampling probe 51 to the ion source 160. For example, as shown in FIG. 1B, the solvent reservoir 150 (e.g., containing a liquid, desorption solvent) can be fluidly coupled to the sampling probe 51 via a supply conduit through which the liquid can be delivered at a selected volumetric rate by the pump 143 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, flow of liquid into and out of the sampling probe 51 occurs within a sample space accessible at the open end such that one or more droplets can be introduced into the liquid boundary 50 at the sample tip 53 and subsequently delivered to the ion source 160. As shown, the system 110 includes an acoustic droplet injection device 11 that is configured to generate acoustic energy that is applied to a liquid contained with a reservoir (as depicted in FIG. 1A) that causes one or more droplets 49 to be ejected from the reservoir into the open end of the sampling probe 51. A controller 180 can be operatively coupled to the acoustic droplet injection device 11 and can be configured to operate any aspect of the acoustic droplet injection device 11 (e.g., focusing means, acoustic radiation generator, automation means for positioning one or more reservoirs into alignment with the acoustic radiation generator, etc.) so as to inject droplets into the sampling probe 51 or otherwise discussed herein substantially continuously or for selected portions of an experimental protocol by way of non-limiting example.

As shown in FIG. 1B, the exemplary ion source 160 can include a source 65 of pressurized gas (e.g. nitrogen, air, or a noble gas) that supplies a high velocity nebulizing gas flow which surrounds the outlet end of the electrospray electrode 164 and interacts with the fluid discharged therefrom to enhance the formation of the sample plume and the ion release within the plume for sampling by 114b and 116b, e.g., via the interaction of the high speed nebulizing flow and jet of liquid sample (e.g., analyte-solvent dilution). The nebulizer gas can be supplied at a variety of flow rates, for example, in a range from about 0.1 L/min to about 20 L/min, which can also be controlled under the influence of controller 180 (e.g., via opening and/or closing valve 163). In accordance with various aspects of the present teachings, it will be appreciated that the flow rate of the nebulizer gas can be adjusted (e.g., under the influence of controller 180) such that the flow rate of liquid within the sampling probe 51 can be adjusted based, for example, on suction/aspiration force generated by the interaction of the nebulizer gas and the analyte-solvent dilution as it is being discharged from the electrospray electrode 164 (e.g., due to the Venturi effect).

In the depicted embodiment, the ionization chamber 112 can be maintained at an atmospheric pressure, though in some embodiments, the ionization chamber 112 can be evacuated to a pressure lower than atmospheric pressure. The ionization chamber 112, within which the analyte can be ionized as the analyte-solvent dilution is discharged from the electrospray electrode 164, is separated from a gas curtain chamber 114 by a plate 114a having a curtain plate aperture 114b. As shown, a vacuum chamber 116, which houses the mass analyzer 170, is separated from the curtain chamber 114 by a plate 116a having a vacuum chamber sampling orifice 116b. The curtain chamber 114 and vacuum chamber 116 can be maintained at a selected pressure(s) (e.g., the same or different sub-atmospheric pressures, a pressure lower than the ionization chamber) by evacuation through one or more vacuum pump ports 118.

It will also be appreciated by a person skilled in the art and in light of the teachings herein that the mass analyzer 170 can have a variety of configurations. Generally, the mass analyzer 170 is configured to process (e.g., filter, sort, dissociate, detect, etc.) sample ions generated by the ion source 160. By way of non-limiting example, the mass analyzer 170 can be a triple quadrupole mass spectrometer, or any other mass analyzer known in the art and modified in accordance with the teachings herein. Other non-limiting, exemplary mass spectrometer systems that can be modified in accordance various aspects of the systems, devices, and methods disclosed herein can be found, for example, in an article entitled "Product ion scanning using a Q-q-$Q_{linear}$ ion trap (Q TRAP®) mass spectrometer," authored by James W. Hager and J. C. Yves Le Blanc and published in Rapid Communications in Mass Spectrometry (2003; 17: 1056-1064), and U.S. Pat. No. 7,923,681, entitled "Collision Cell for Mass Spectrometer," which are hereby incorporated by reference in their entireties. Other configurations, including but not limited to those described herein and others known to those skilled in the art, can also be utilized in conjunction with the systems, devices, and methods disclosed herein. For instance, other suitable mass spectrometers include single quadrupole, triple quadrupole, ToF, trap, and hybrid analyzers. It will further be appreciated that any number of additional elements can be included in the system 110 including, for example, an ion mobility spectrometer (e.g., a differential mobility spectrometer) that is disposed between the ionization chamber 112 and the mass analyzer 170 and is configured to separate ions based on their mobility through a drift gas in high- and low-fields rather than their mass-to-charge ratio). Additionally, it will be appreciated that the mass analyzer 170 can comprise a detector that can detect the ions which pass through the analyzer 170 and can, for example, supply a signal indicative of the number of ions per second that are detected.

Figure 2:
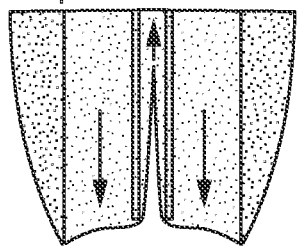
FIG. 2 schematically illustrates the possible flow patterns at the open port of the flow probe, also referred to herein as the "sampling tip."
Figure 2:
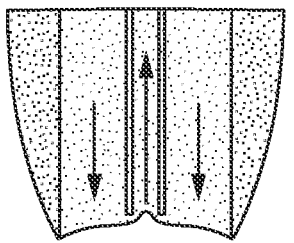
Figure 2:
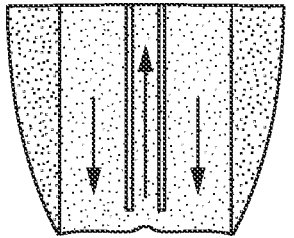
Figure 2:
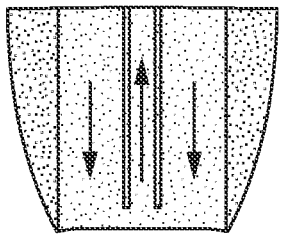
Figure 2:
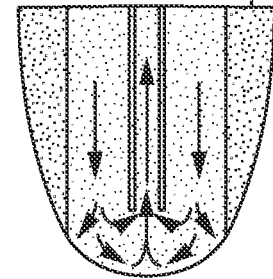

It will be appreciated that one or more probe variables can be manipulated prior to or during the present method. These probe variables include, by way of example, (i) changing, i.e., increasing or decreasing, a distance between an outer capillary tip 77 and an inner capillary tip 79, and (ii) changing the flow rate of analyte-solvent dilution flow in the sample transport capillary 61 relative to the flow rate of the solvent flow in the solvent transport capillary 59. These probe variables can be selected by one of ordinary skill in the art to optimize one or more parameters of the system, thus providing precise and active flow control. One feature of the system that can be modified using the aforementioned variables is the shape of the terminal flow pattern, i.e., the flow configuration at the sampling tip 53 of the flow probe 51 as illustrated by liquid boundaries 50 in FIG. 1A, which impacts on the extent to which an analyte droplet ejected by the ADE system is diluted by the circulating solvent in the flow probe 51, which in turn affects the quality of a subsequent spectroscopic analysis (as established in the Examples herein). Possible terminal flow patterns are schematically illustrated in FIG. 2, each illustrating a different liquid boundary location and profile. As shown in the figure, the terminal flow pattern may be in the form of a supercritical vortex, a critical vortex, or a subcritical vortex, or it may be evenly balanced or in a configuration likely to result in a pendant drop. It has been found that the supercritical vortex (and to a lesser extent the critical vortex) is the optimal flow configuration at the sampling tip in terms of subsequent spectroscopic results. The flow rate difference between (1) the solvent inflow rate and thus the solvent flow rate through the solvent transport capillary 59 from the solvent inlet 57 to the sampling tip 53, and (2) the sample flow rate from the sampling tip 53 toward the sample outlet, determines the terminal flow pattern. As the solvent inflow rate increases relative to the sample flow rate outward, which is generally fixed during use with an unchanging gas pressure at the nebulizing gas inlet, the terminal flow pattern transitions from the supercritical vortex, to a critical vortex, to a subcritical vortex, to balanced flow, and finally to the protruding meniscus that can result in a pendant drop.

The analytical instrument into which the analyte-solvent dilution exiting the flow probe through outlet 63 is directed can be any instrument used for detecting analyte, determining the amount or concentration of analyte in a sample, or determining the chemical composition of an analyte. When the analytical instrument is a mass spectrometer or other type of device requiring the analyte to be in ionized form, the exiting droplets pass through an ionization region, prior to entering the mass spectrometer or other analytical instrument requiring that analyte be in ionized form. In the ionization region, a selected ionization source, e.g., an electrospray ion source, converts the analyte to ionized form. Exemplary analytical instruments include, but are not limited to, mass spectrometers, spectroscopy devices, separation systems, and combinations thereof. Exemplary ionization techniques include, but are not limited to, chemical ionization, electron impact ionization, desorption chemical ionization, inductively coupled plasma ionization, and atmospheric pressure ionization, including electrospray ionization and atmospheric pressure chemical ionization, and atmospheric pressure photo-ionization. Exemplary separation methods include, but are not limited to liquid chromatography, solid phase extraction, HPLC, capillary electrophoresis, or any other liquid phase sample cleanup or separation process. Exemplary mass spectrometers include, but are not limited to, sector mass spectrometers, time-of-flight mass spectrometers, quadrupole mass filter mass spectrometers, three-dimensional quadrupole ion trap mass spectrometers, linear quadrupole ion trap mass spectrometers, toroidal ion trap mass spectrometers, and Fourier transform ion cyclotron resonance mass spectrometers.

In addition, the invention herein is intended to encompass various ways of optimizing the acoustic ejection process. For example, as described in U.S. Pat. No. 6,932,097 to Ellson et al., U.S. Pat. No. 6,938,995 to Ellson et al., U.S. Pat. No. 7,354,141 to Ellson et al., U.S. Pat. No. 7,899,645 to Qureshi et al., U.S. Pat. No. 7,900,505 to Ellson et al., U.S. Pat. No. 8,107,319 to Stearns et al., U.S. Pat. No. 8,453,507 to Ellson et al., and U.S. Pat. No. 8,503,266 to Stearns et al., the above acoustic droplet ejectors can be utilized for characterization of a fluid in a reservoir, to measure the height of the fluid meniscus as well as other properties, such as fluid volume, viscosity, density, surface tension, composition, acoustic impedance, acoustic attenuation, speed of sound in the fluid, etc., any or all of which can then be used to determine optimum parameters for droplet ejection, including acoustic power, acoustic frequency, toneburst duration, and/or the F-number of the focusing lens. As another example, acoustic interrogation processes can be used to optimize the relative position of the acoustic ejector and a fluid-containing reservoir in a focus-activated acoustic ejection system, as described in U.S. Pat. Nos. 8,544,976 and 8,882,226 to Ellson et al. An additional example is a method for optimizing the amplitude of the acoustic radiation used to eject fluid droplets, by analyzing the waveforms of acoustic radiation reflected from surfaces within the reservoir prior to ejection; see U.S. Pat. Nos. 7,717,544 and 8,770,691 to Stearns et al. Droplet size and consistency can be ensured using the method of U.S. Pat. No. 6,383,115 to Hadimioglu et al., and variations in reservoir properties can be controlled for using the methods of U.S. Pat. No. 7,481,511 to Mutz et al. and U.S. Pat. No. 7,784,331 to Ellson et al.

It is to be understood that while the invention has been described in conjunction with a number of specific embodiments, the foregoing description as well as the examples that follow are intended to illustrate and not limit the scope of the invention. In this regard, no attempt is made to show structural details of the invention in more detail than is necessary for the fundamental understanding of the invention, the description taken with the drawings and/or examples making apparent to those skilled in the art how the invention may be embodied in practice. This disclosure includes all modifications and equivalents of the subject matter recited in the claims appended hereto as permitted by applicable law. Moreover, any combination of the elements of the invention described herein are encompassed by the disclosure unless otherwise indicated herein or clearly contradicted by context.

EXPERIMENTAL

An acoustic loading device employing an acoustic droplet ejector system and continuous flow sampling probe was set up as shown in FIG. 1A. Key components of the setup, shown in FIG. 2, include a precision pump with active flow control driving solvent through the solvent inlet into the solvent transport capillary, a continuous flow sampling probe with an open port at the sampling tip, a mass spectrometer (AB Sciex 5500 QTrap) with nebulizing aspirator and ion source, and the ADE acoustic liquid handler positioned such that droplets of an analyte-containing fluid sample can be ejected vertically from a source well in a multi-well source plate to the solvent meniscus at the open port of the flow probe.

An Echo® 555 Liquid Handler (Labcyte Inc., San Jose, Calif.) served as the acoustic droplet ejector system, with the ultrasonic transducer assembly mounted externally via an umbilical cable and mechanical stages incorporated for alignment of the acoustic source to the open port of the flow probe. Fluid samples were loaded into wells of a 384-well polypropylene source plate and the source plate mounted to a motorized stage system to provide for automated sampling from any source well.

The transport capillaries of the probe resulted from coaxial positioning of capillary tubes: an outer capillary tube, 1.75 mm inner diameter, 3.18 mm outer diameter, connected to mass spectrometer electrical ground, and an inner capillary tube with a 100-micron to 250-micron inner diameter and 360-micron outer diameter. The inner and outer tubes were mounted in a Tee-fitting.

A precision low pressure pump (peristaltic, rotary, syringe, with active flow control) was used to drive solvent flow in the annular region between the outer and inner tubes of the flow probe to the open port. Flow rate ranged from 1 to 1000 µL per minute. Solvent flowed to the open port where it was aspirated by the inner capillary and flowed in the transfer line a total distance of approximately 50 centimeters into the mass spectrometer ion source (model number) and into an ESI emitter. (ESI aspiration flow rate, curtain gas, heated nebulizer temperature.) A desired supercritical shaped vortex interface was maintained by dynamic feedback and active flow control.

The Echo 555 system was calibrated for aqueous solutions, including methanol up to 50% in water as well as up to 50% acetonitrile. The ADE system can eject a broad range of fluid classes with high accuracy, precision and speed. The acoustic transducer can also be utilized for auto-characterization of a fluid in a reservoir, to measure the height of the fluid meniscus as well as other properties (e.g., fluid volume, viscosity, density, surface tension, acoustic impedance, acoustic attenuation, speed of sound in the fluid, etc.) to determine optimum parameters for droplet ejection, including acoustic power, the acoustic frequency, the toneburst duration, and/or the F-number of the focusing lens.

The flow probe was mounted above the selected source well and oriented vertically to capture droplets ejected by the acoustic transducer. Solvent and sample enter the inner capillary tube of the flow probe, with a flow rate set by the aspirating nebulizer.

Under steady-state flow conditions with a stable solvent pump rate a consistent analyte elution profile resulted from mixing by both solvent advection and diffusion effects. Acoustically ejected sample droplets traveled up from the surface of the fluid in the source well to the sampling tip of the flow probe, i.e., the open port, where they fuse with the solvent meniscus. Analyte diffuses and mixes with solvent at the open port where flows can be turbulent, and a vortex may form at the capillary entrance. Advection of analyte into the inner capillary tube leads to dilution of analyte into solvent and away from the fluid matrix upward. There is then a transition from turbulent to laminar flow upon entry to the inner capillary. Analyte is further diluted by diffusion into solvent during the capillary transit time from the open port to the nebulizing aspirator ESI output. There is also analyte dispersion due to the Poiseuille flow profile in the capillary that contributes to the elution profile at the nebulizing aspirator output. Finally, the ESI source ionized analyte that arrives at the nebulizing aspirator.

As shown in Example 3, below, dilution of analyte into the solvent and away from the matrix effectively mitigates matrix ion suppression issues.

Example 1

This example describes how the flow configuration at the open port of the probe correlates with the ion peaks obtained in a real-time mass spectrometric (MS) evaluation. In this experiment, source wells were loaded with 50 µL of reserpine, as analyte (Sigma-Aldrich, St. Louis, Mo.) at a concentration of 100 nM in 50:50 MeOH:$H_2O$. The flow probe was positioned above the source well at a distance of approximately 10 mm, aligned to center the flow probe over the source well, and oriented so that the open port of the flow probe captured droplets acoustically ejected vertically upward from the source well. The carrier solvent in the flow probe was 100% methanol and the solvent flow rate in the tubing annulus was varied from 40 µL/min to 55 µL/min by adjusting the active flow control solvent pump. The flow rate of solvent into the inner capillary tube was fixed by the gas flow of the aspirating nebulizer at the mass spectrometer input.

Figure 3:
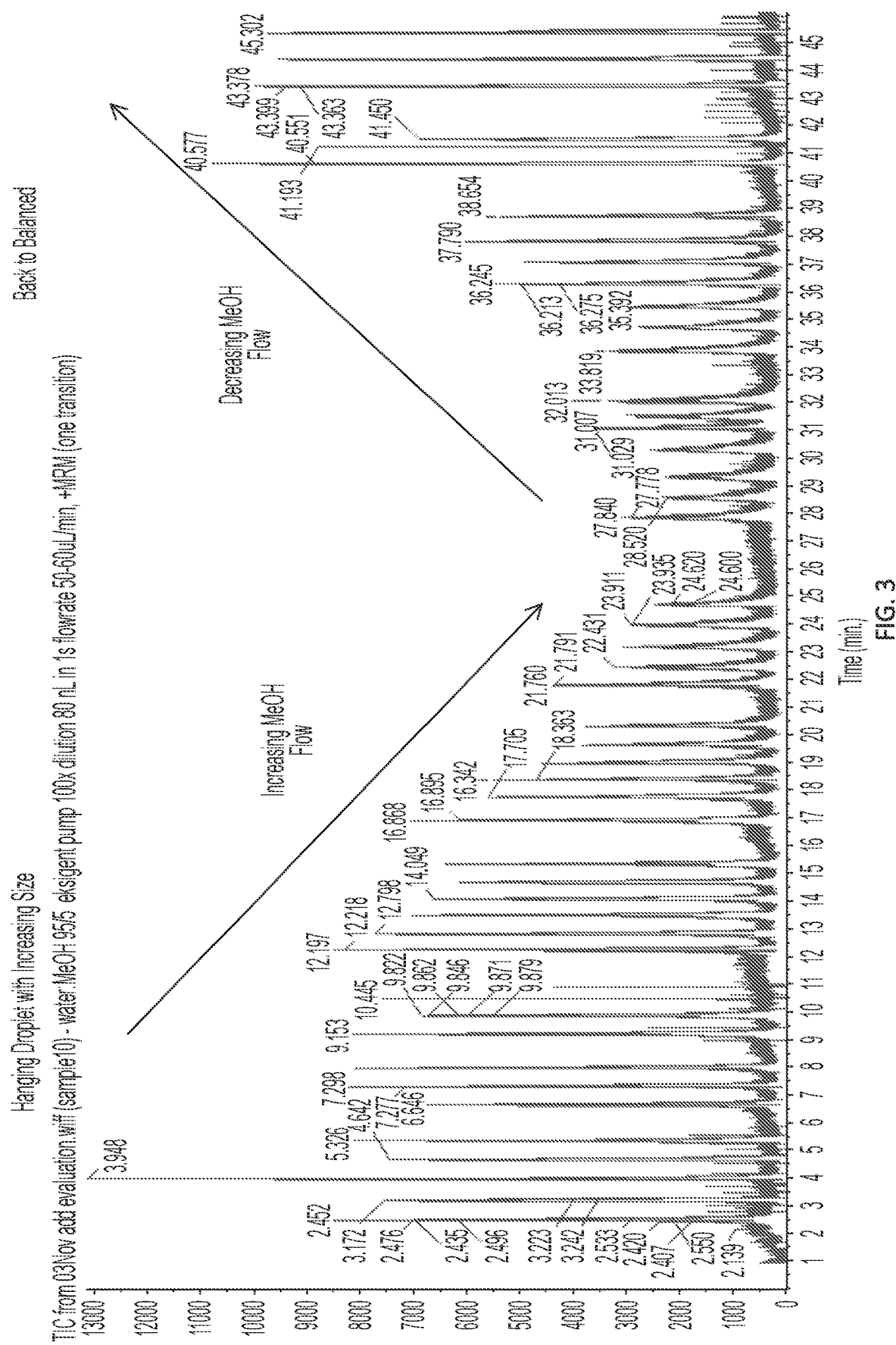
FIG. 3 provides the results of a real-time mass spectrometric (MS) analysis evaluating the impact of the terminal flow pattern on MS peak shape, as described in Example 1.

2.5 nL droplets were acoustically ejected over a 1 second period at a repetition rate of 10 Hz from the source well into the open port of the flow probe. The impact of flow pattern at the sampling tip on MS peak shape was measured by slowly varying the active flow control solvent flow rate starting with a balanced configuration (as illustrated in FIG. 2 and more particularly described in Rapid Comm. Mass Spectrometry, 2015, 29, 1749-1756, the contents of which are incorporated by reference) and gradually increasing the solvent flow rate to form a pendant drop (as also illustrated in FIG. 2). As can be seen in the real-time mass spectrum obtained, in FIG. 3, the peaks are initially tall and sharp. When the solvent flow rate was increased, and the balanced configuration transitioned to the large pendant drop configuration, the MS peaks became shorter and wider, as can be seen throughout the 17 min-39 min time period. Decreasing the solvent flow rate thereafter returned the flow configuration to the balanced state, and the peaks obtained were once again tall and sharp, as can be seen in the 41 min-45 min time period. Analyte elution profile and measured ion signal peak shape thus vary with the flow configuration at the open port, with the large pendant droplet flow pattern leading to greater dilution of the droplet and broader, lower intensity peaks, with a balanced flow configuration giving rise to tall, sharp peaks.

Example 2

The source wells were filled with 50 µL of analyte 1 nM reserpine in a matrix of 50% MeOH:$H_2O$ and the flow probe solvent flow rate adjusted to produce a pendant drop of 100% MeOH at the tip of the flow probe. The ADE system was calibrated to eject 2.5 nL droplets with repetition rates adjusted from 1 Hz to 200 Hz.

Figure 4B:
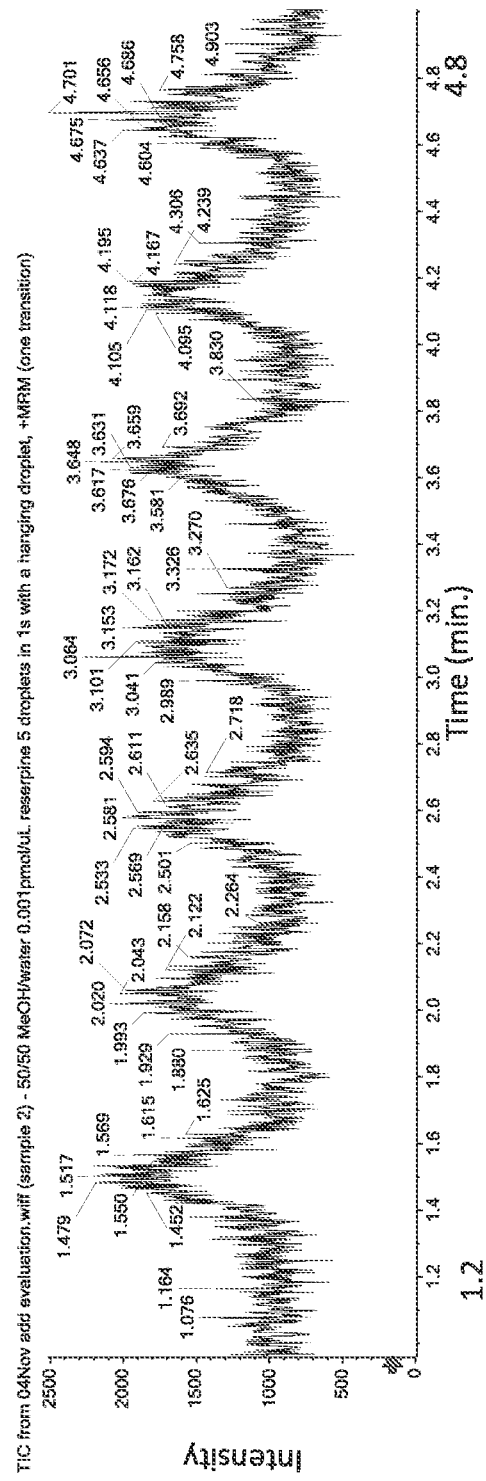
Figure 4C:
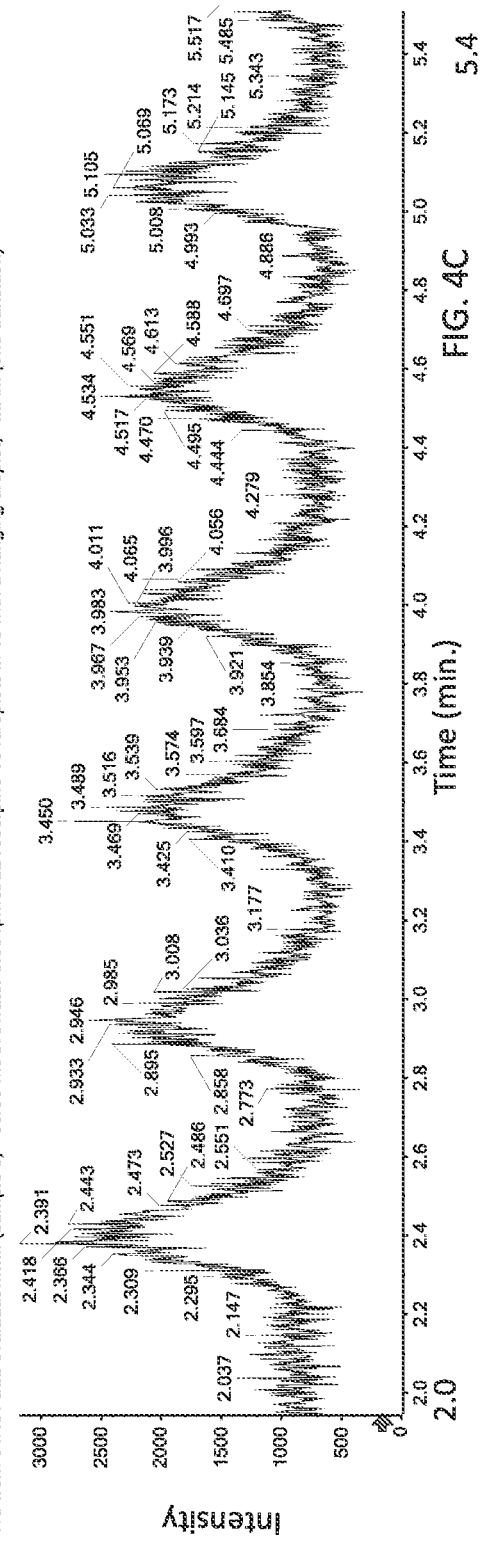
Figure 4D:
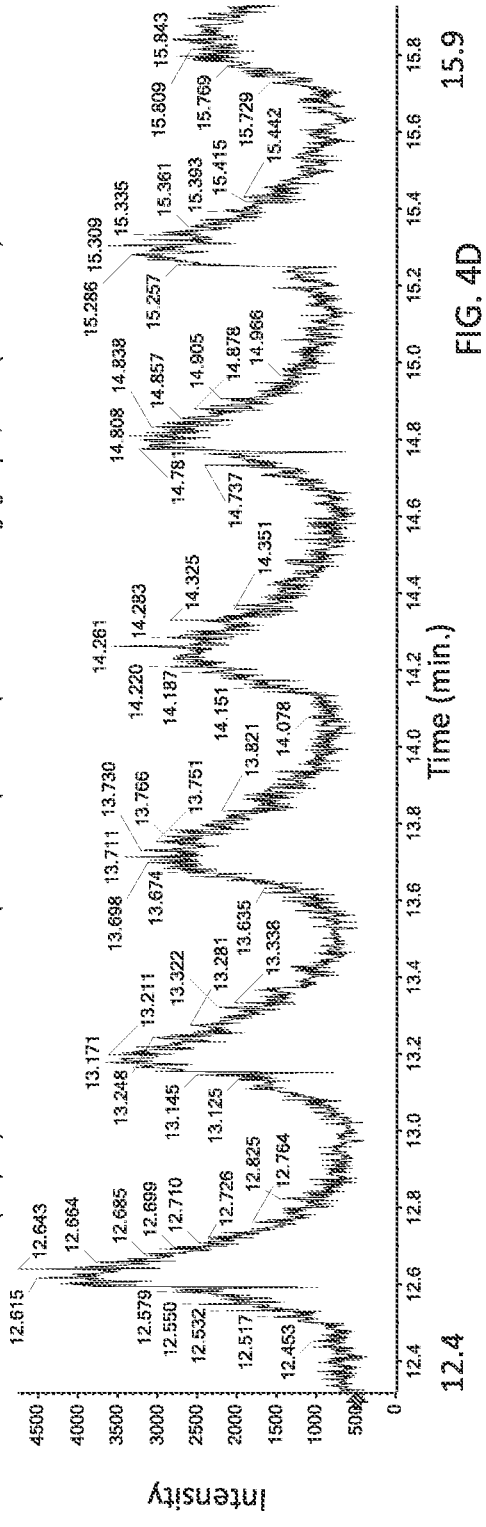
Figure 4G:
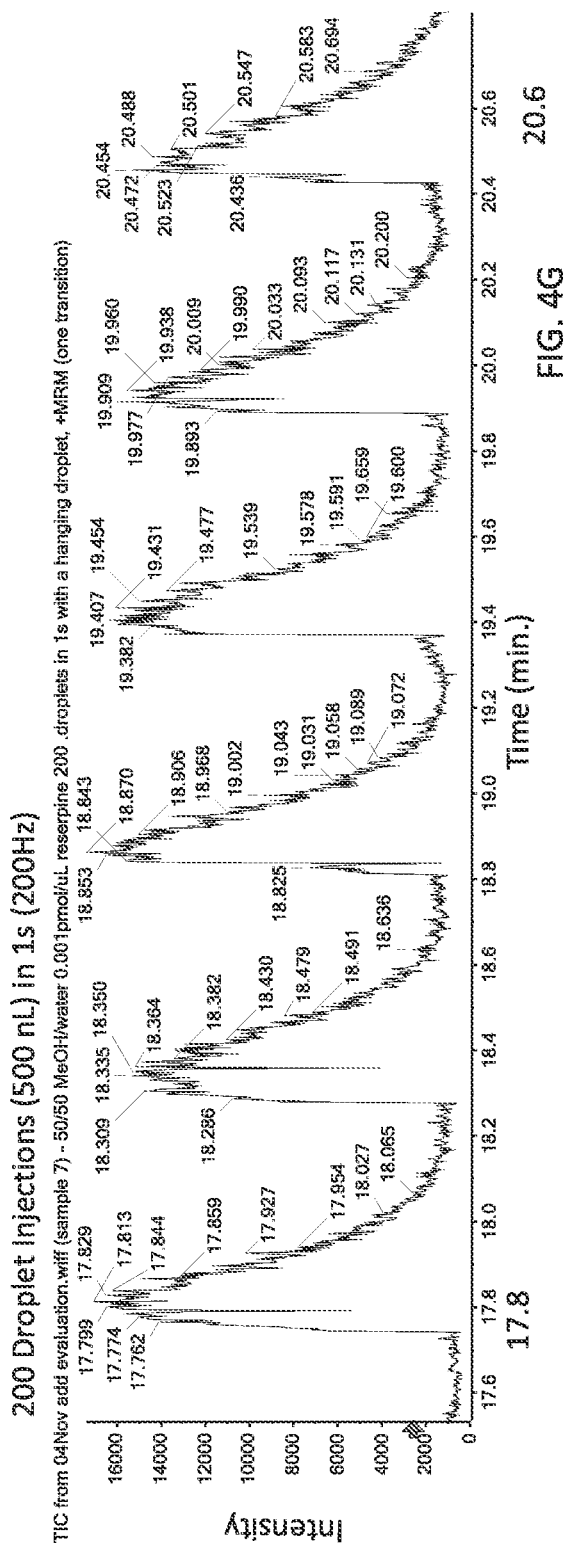

As shown in the mass spectra of FIG. 4A, single 2.5 nL droplets of 1 nM reserpine (2.5 attomol) are below LOQ in the pendant drop mode. Referring to FIG. 4B, a sample composed of five droplet injections (12.5 nL in total; all within one second) was analyzed and demonstrated good reproducibility with respect to peak shape, with a peak width typically less than 30 seconds. As illustrated in FIGS. 4C-4G, peak area was found to increase approximately linearly with the number of droplet injections per second over the full range of 5 droplet injections per second to 200 droplet injections per second, although small variations in the size of the pendant droplet were found to have an impact on the linearity.

Example 3

Figure 5C:
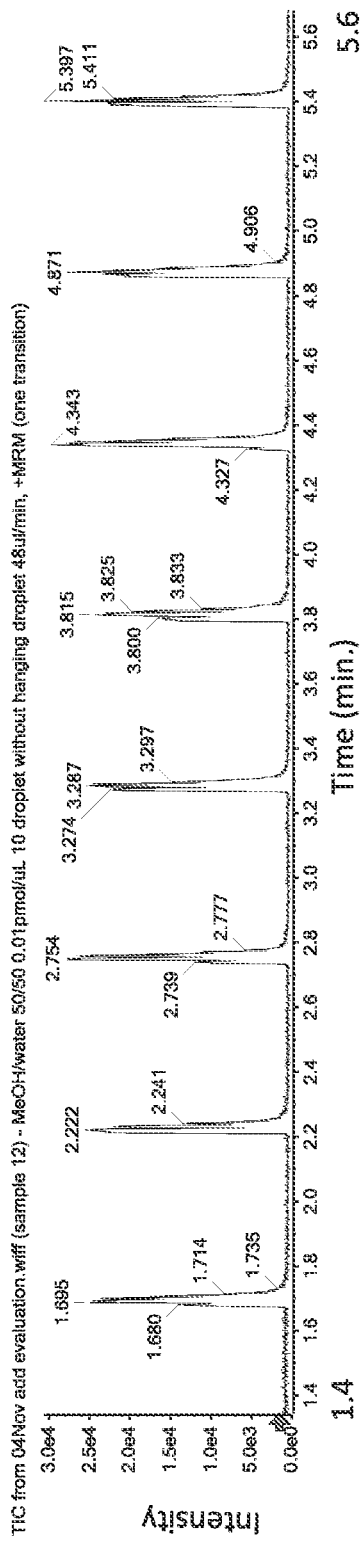
Figure 5D:
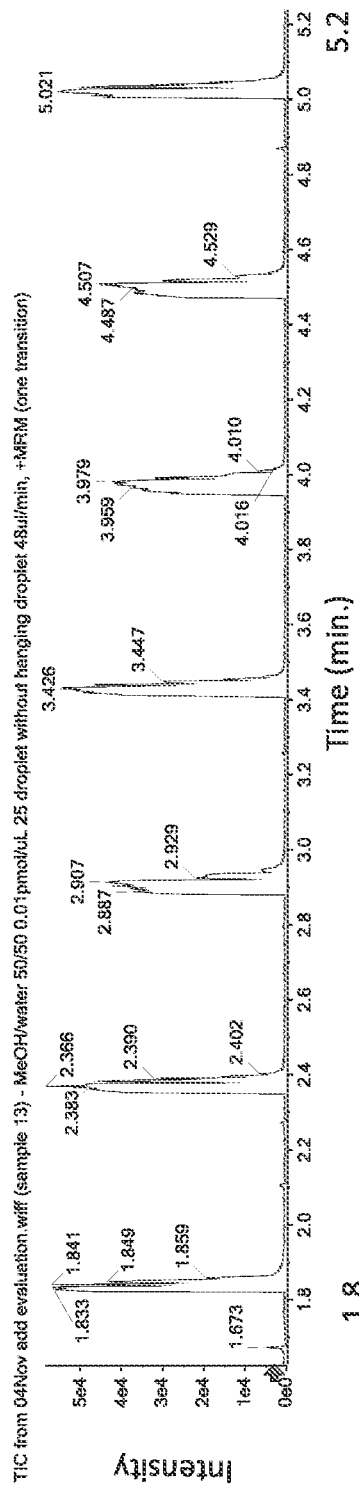
Figure 5E:
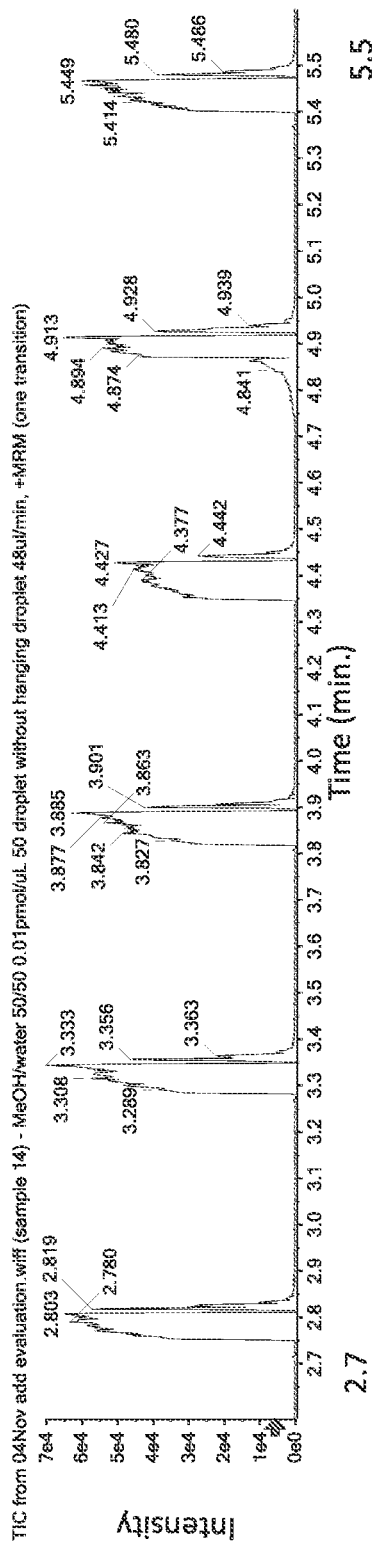
Figure 5F:
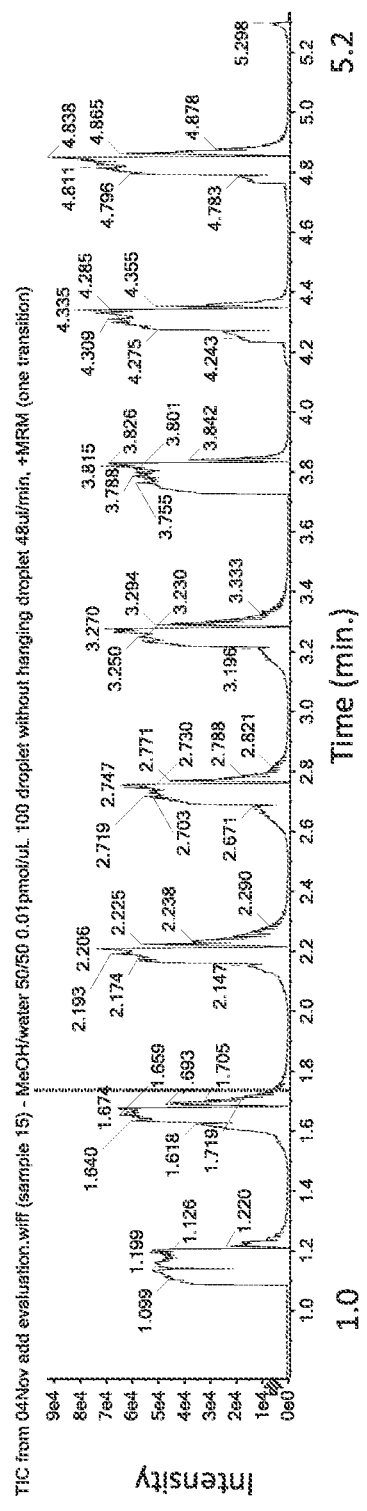
Figure 5G:
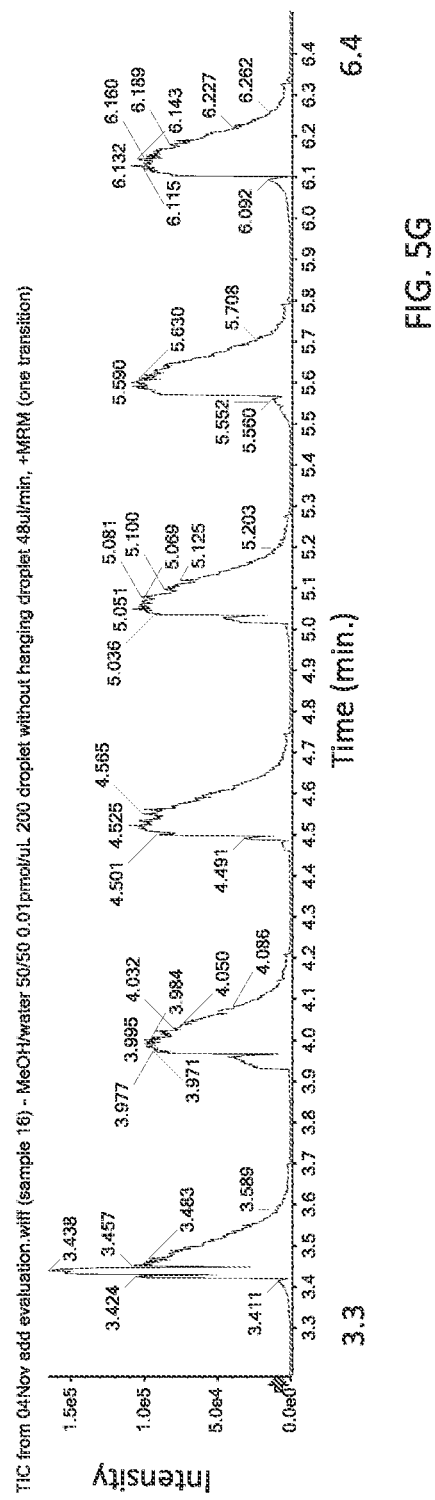

In this example, the method of Example 1 was repeated except that the solvent pump flow rate was adjusted to operate the flow probe in vortex mode, with 10 nM reserpine analyte and a matrix of 50% MeOH:$H_2O$ in the source well. Referring to FIG. 5A, in this case single droplet injections (2.5 nL×10 nM=25 attomol) were found to give clear MS peaks with a two-second width at baseline. Referring to FIGS. 5B-5D, the peaks obtained were consistently narrow (less than about 5 seconds at baseline) for injections of up to 25 droplets in one second. FIGS. 5E-G illustrate resulting peaks for 50, 100, and 200 droplet injections per second for comparison.

Figure 6A:
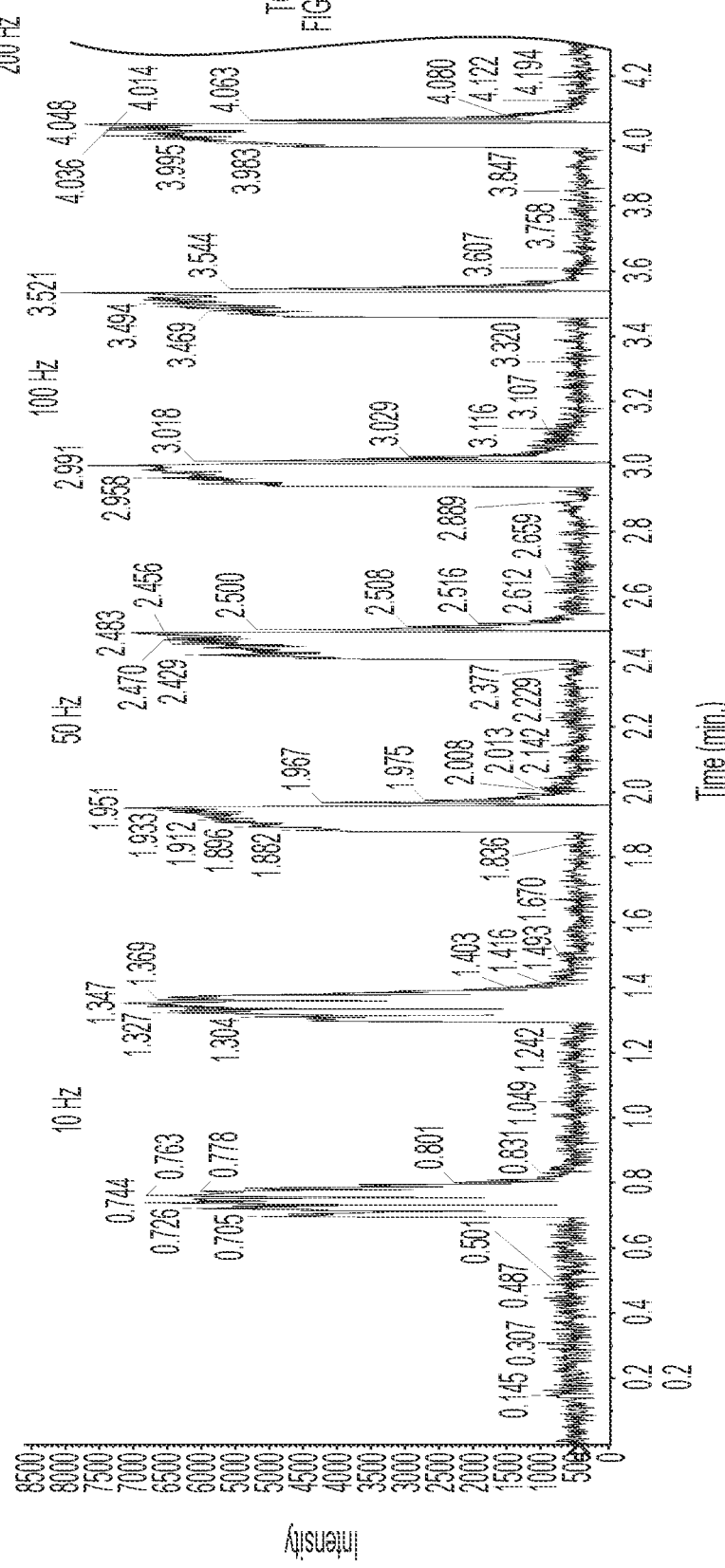
FIGS. 6A and 6B provides the results of a real-time mass spectrometric analysis evaluating the variation of ion peak shape with respect to the time period between droplet ejections, with the flow probe operating in vortex mode, also as described in Example 3.
Figure 6B:
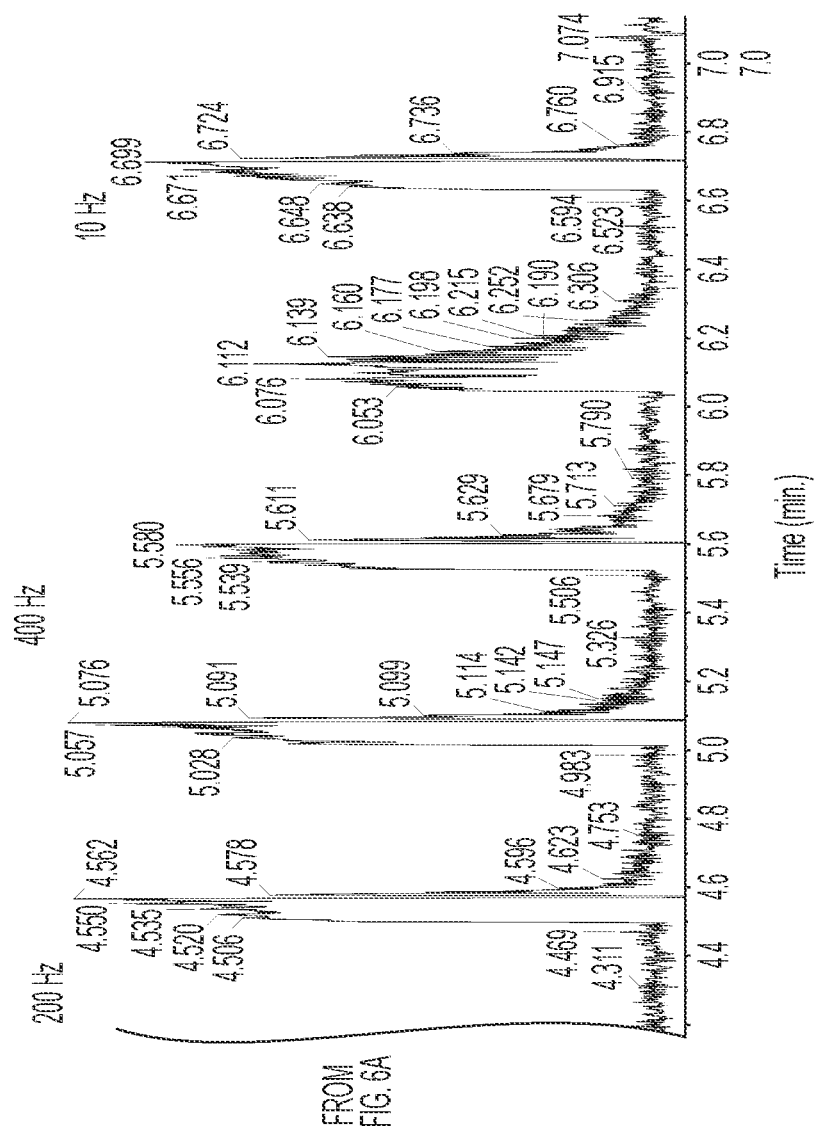

The relationship between peak shape and injection time was evaluated, where the injection time is the time period between the first droplet ejection and the last droplet ejection within a single multi-droplet ejection event. 50 droplets were transferred over a range of injection times from 0.125 to 5 seconds, in vortex mode. FIG. 6 presents a series of peaks illustrating the outcome for the five different injection times representing droplet injection frequencies of 10 Hz, 50 Hz, 100 Hz, 200 Hz, and 400 Hz. As shown in FIG. 6, there was no significant change in peak shape over this range of injection times. Peak width remained consistently in the range 5-10 seconds. The time-course of analyte ion signal exhibited a peak shape typically with a sharp attack due to a well-defined transition region at the front of the analyte "plug" flowing into the capillary. The typical peak shape exhibits a slower decay time due to dispersion or "spreading" of analyte in the vortex and as a result of Poiseuille flow in the capillary.

Figures 1, 7A:
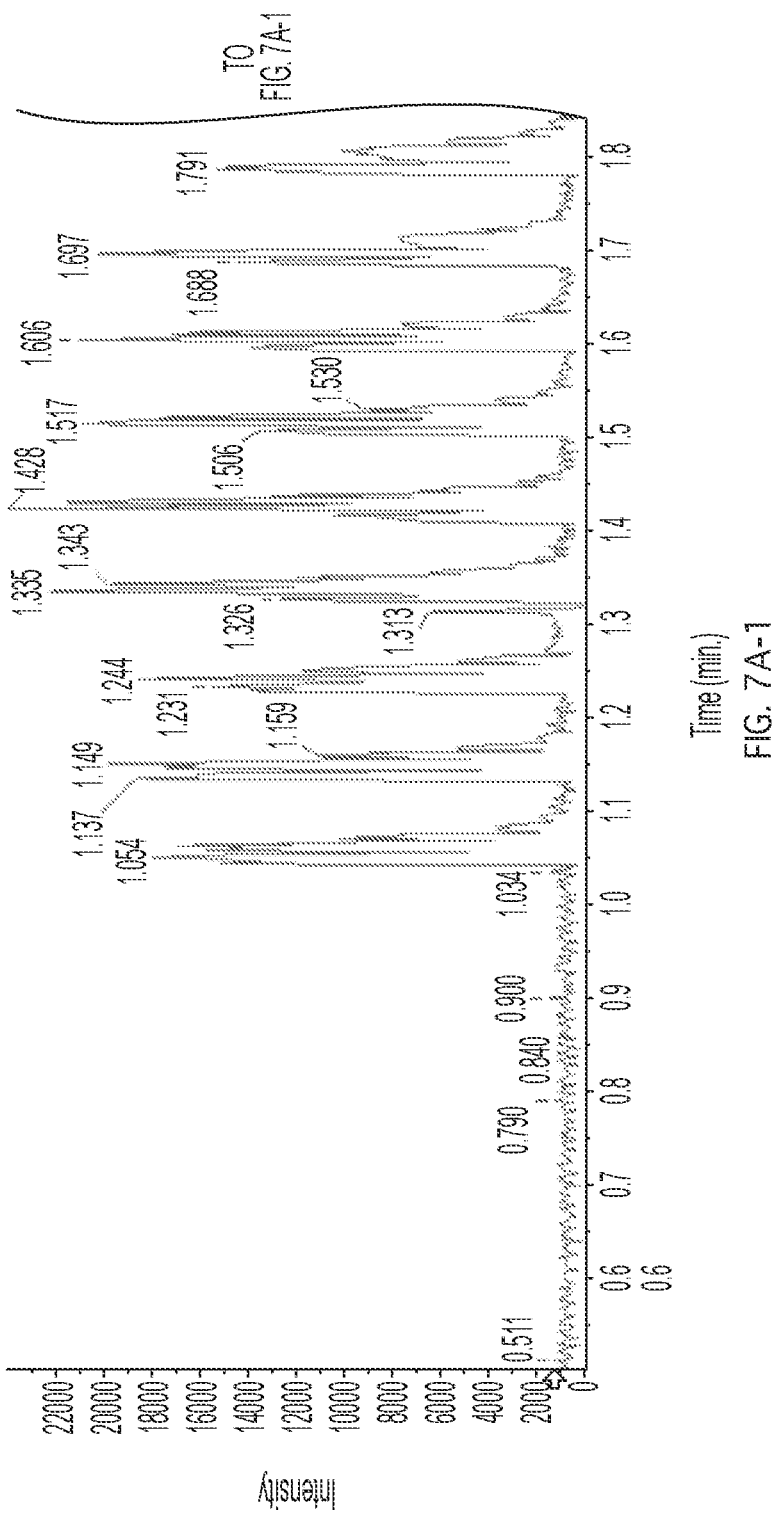
Figures 1, 7B:
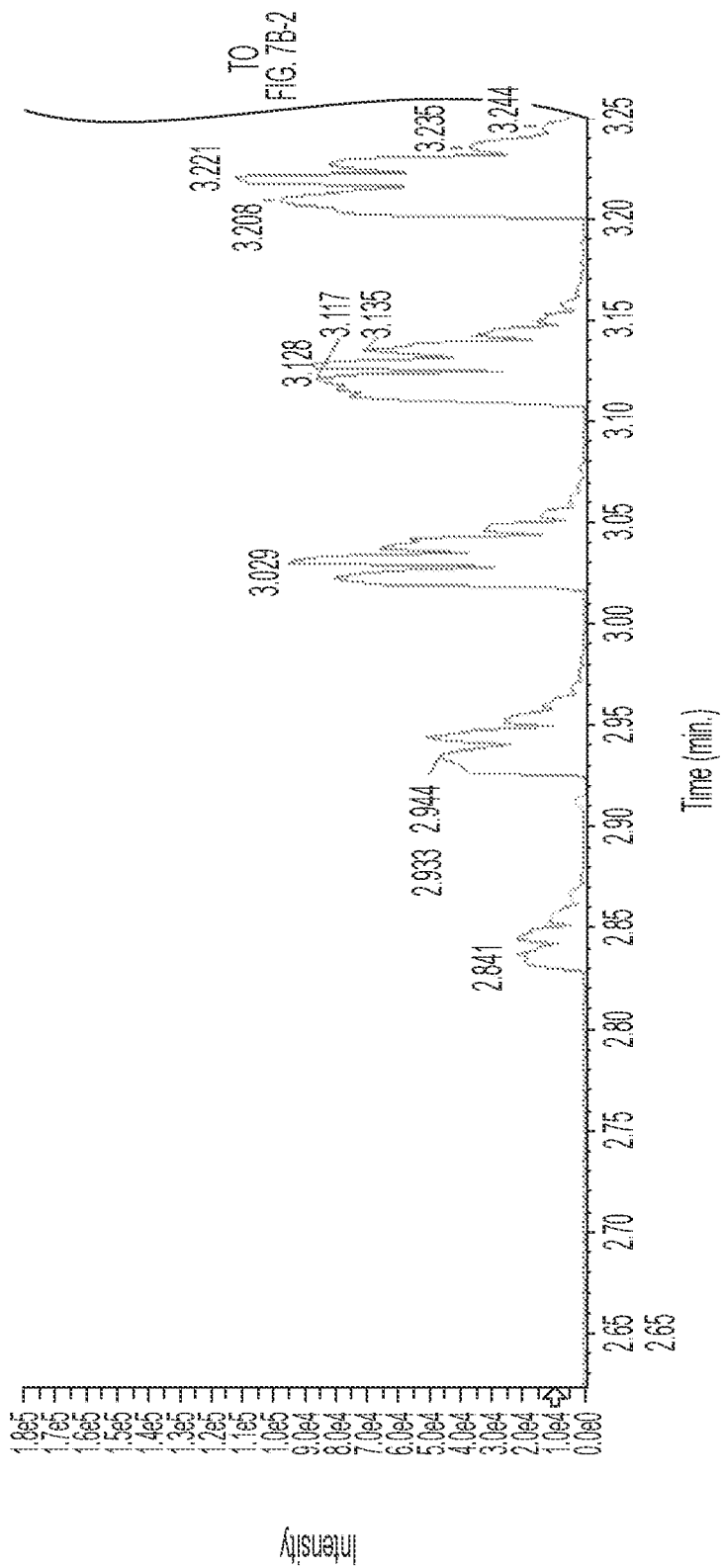
Figures 2, 7B:
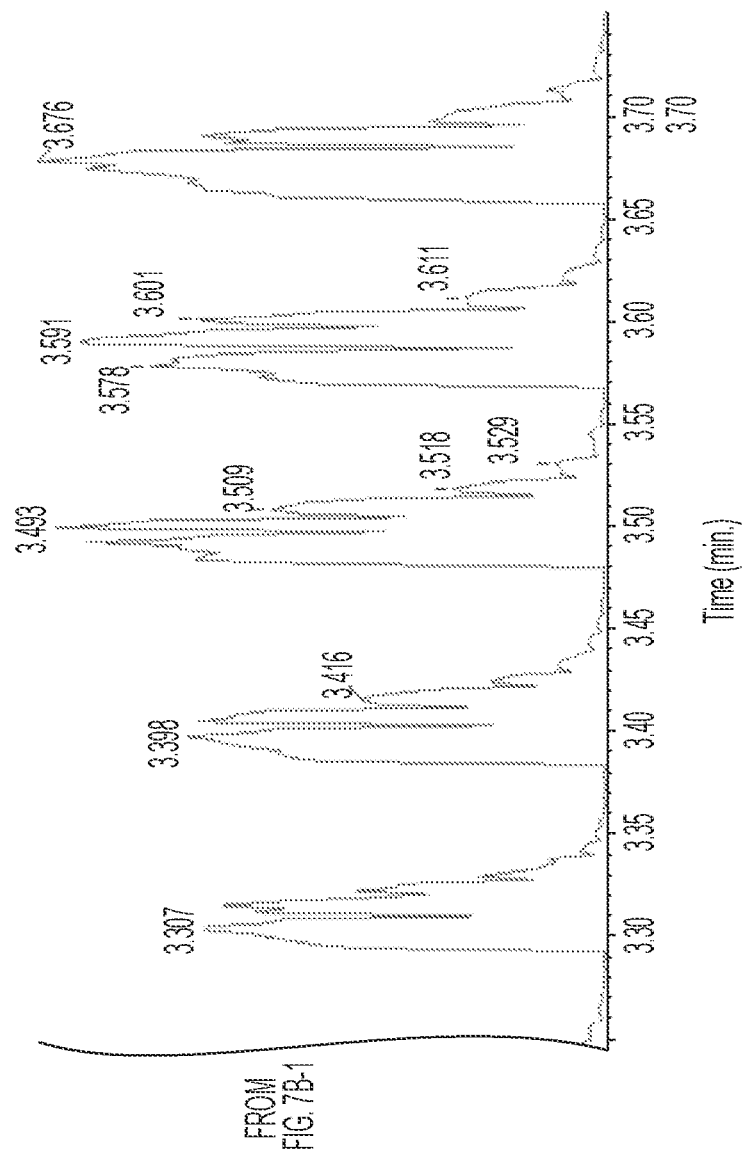

Referring to FIG. 7A, a set of single droplet injections of 100 nM reserpine in 50% MeOH:$H_2O$ with a 5-second delay between injections was evaluated, with the resulting mass spectrum provided in FIG. 7A. Using a ladder injection profile with 1, 2, 3, . . . , to 10 droplets per injection, also with a five-second delay between injections, resulted in the mass spectrum of FIG. 7B.

Example 4

In this example, the fluid sample contained reserpine, as analyte, at a concentration of 100 nM in a matrix of a beta-galactosidase digest of blood plasma. A series of plasma dilutions were tested to measure matrix effects on analyte sensitivity.

Figure 8A:
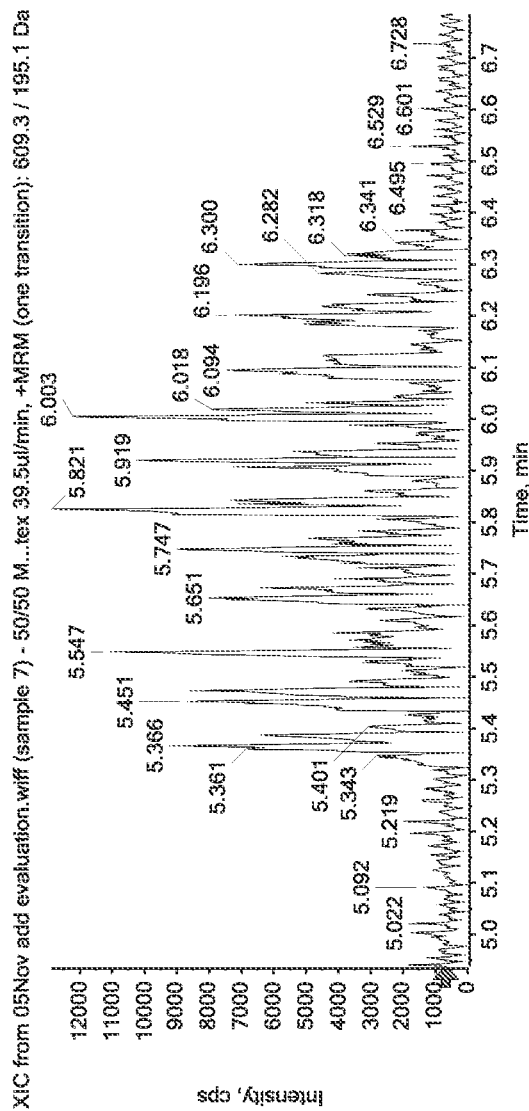
FIGS. 8A, 8B, 8C, 8D & 8E provide mass spectra illustrating the results of an evaluation of the likelihood of matrix ion suppression with the flow probe operating in vortex mode and using various concentrations of a beta-galactosidase digest of blood plasma in a 50:50 methanol:$H_2O$ solution, as described in Example 4.
Figure 8B:
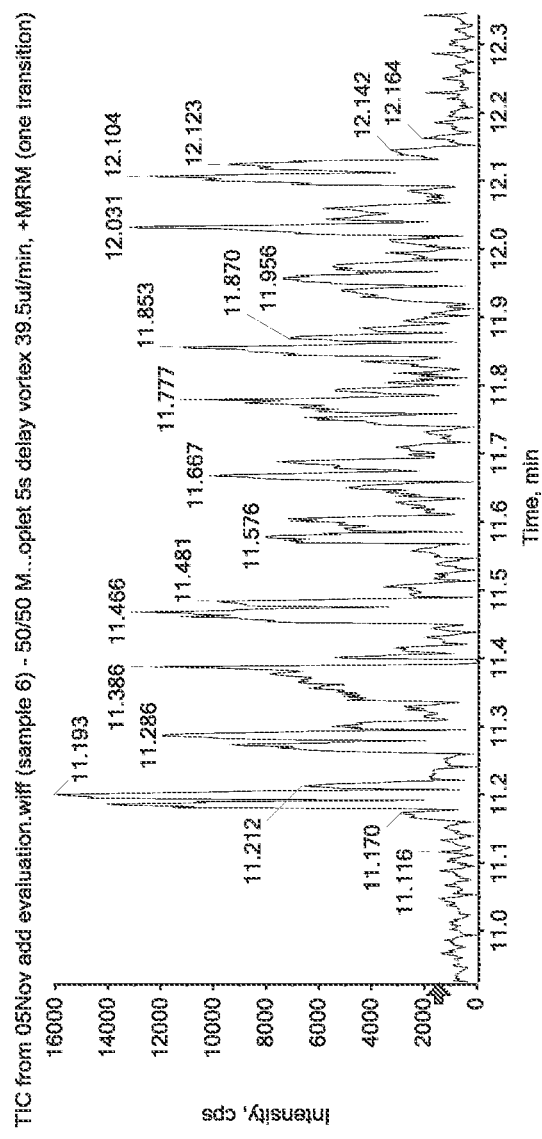
Figure 8C:
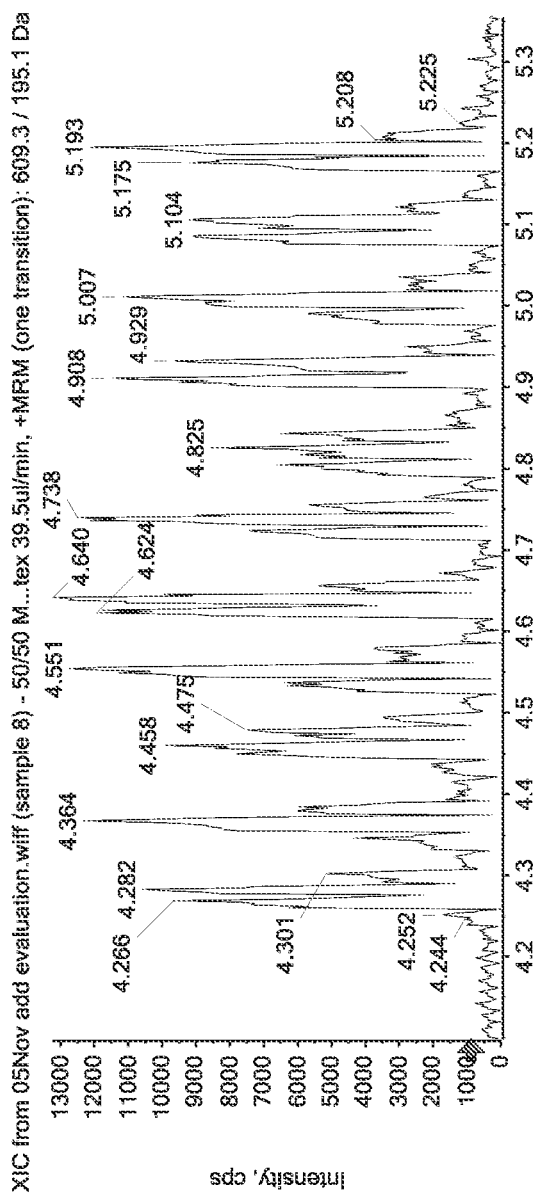
Figure 8D:
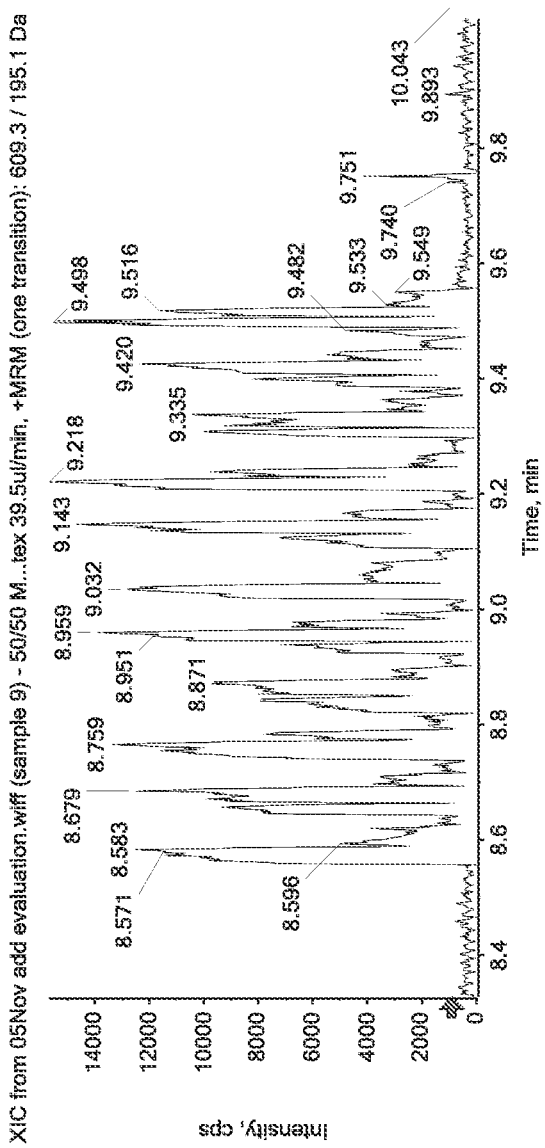
Figure 8E:
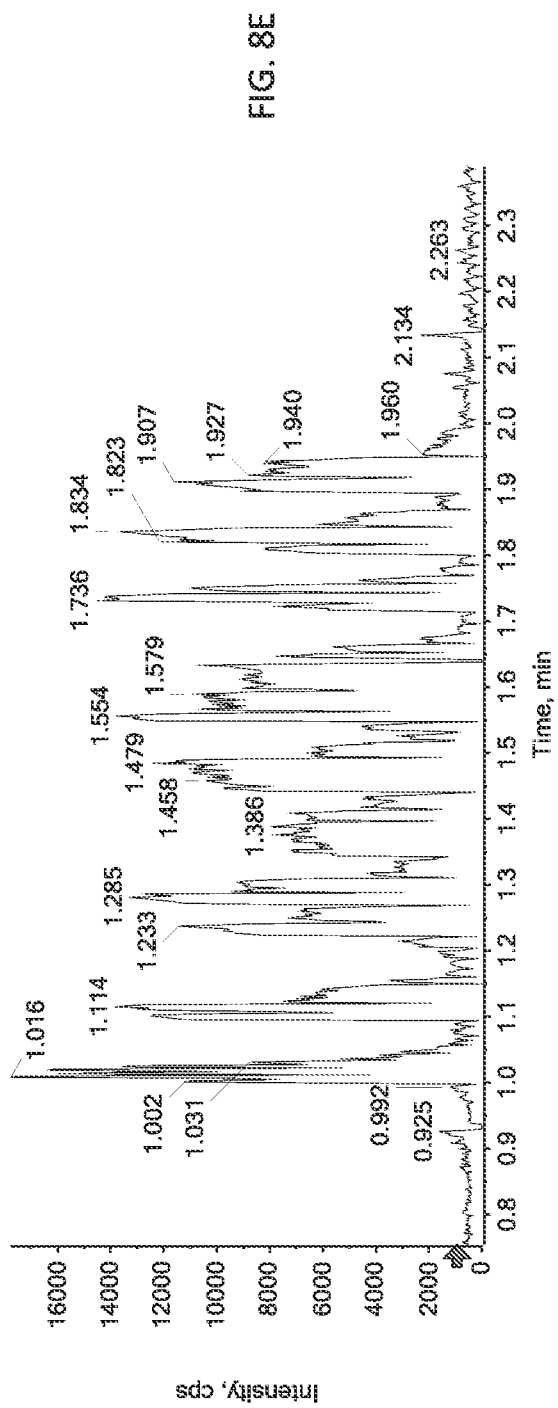
Figures 1, 9A:
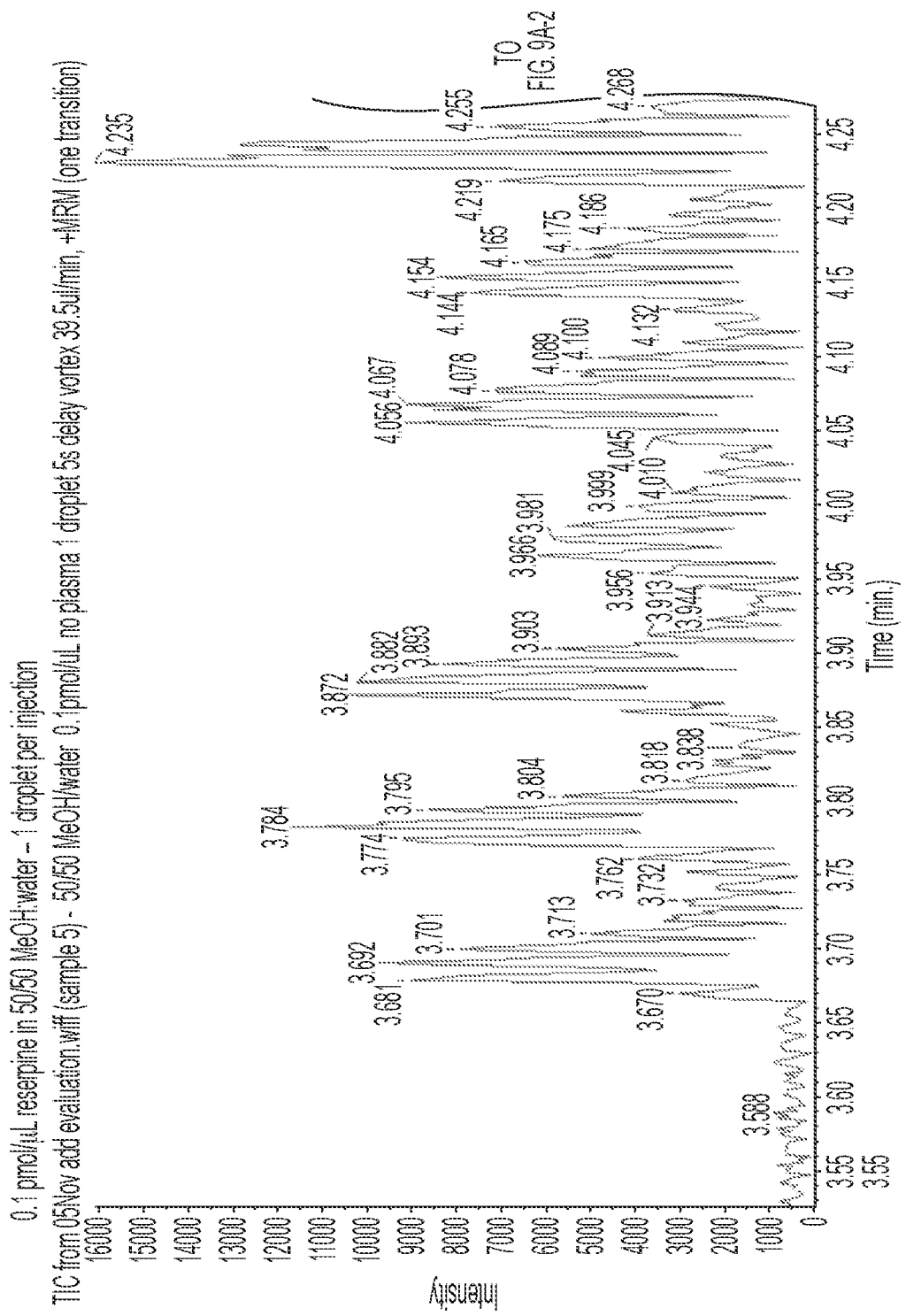
Figures 2, 9A:
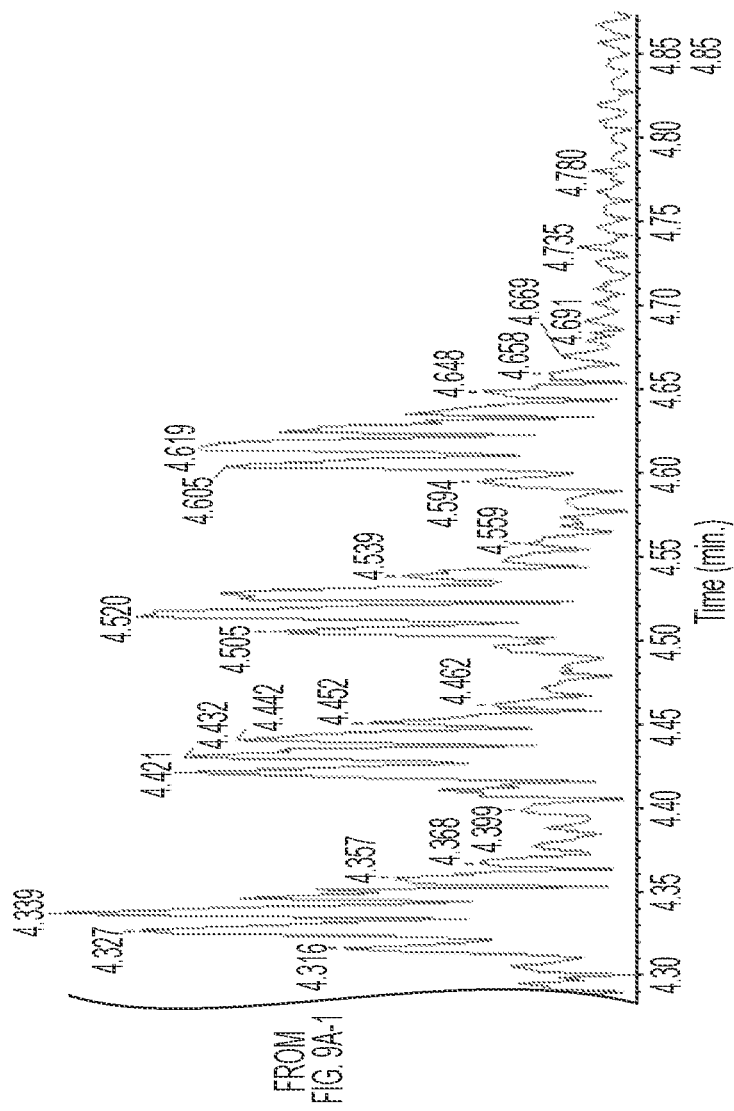
Figures 2, 9B:
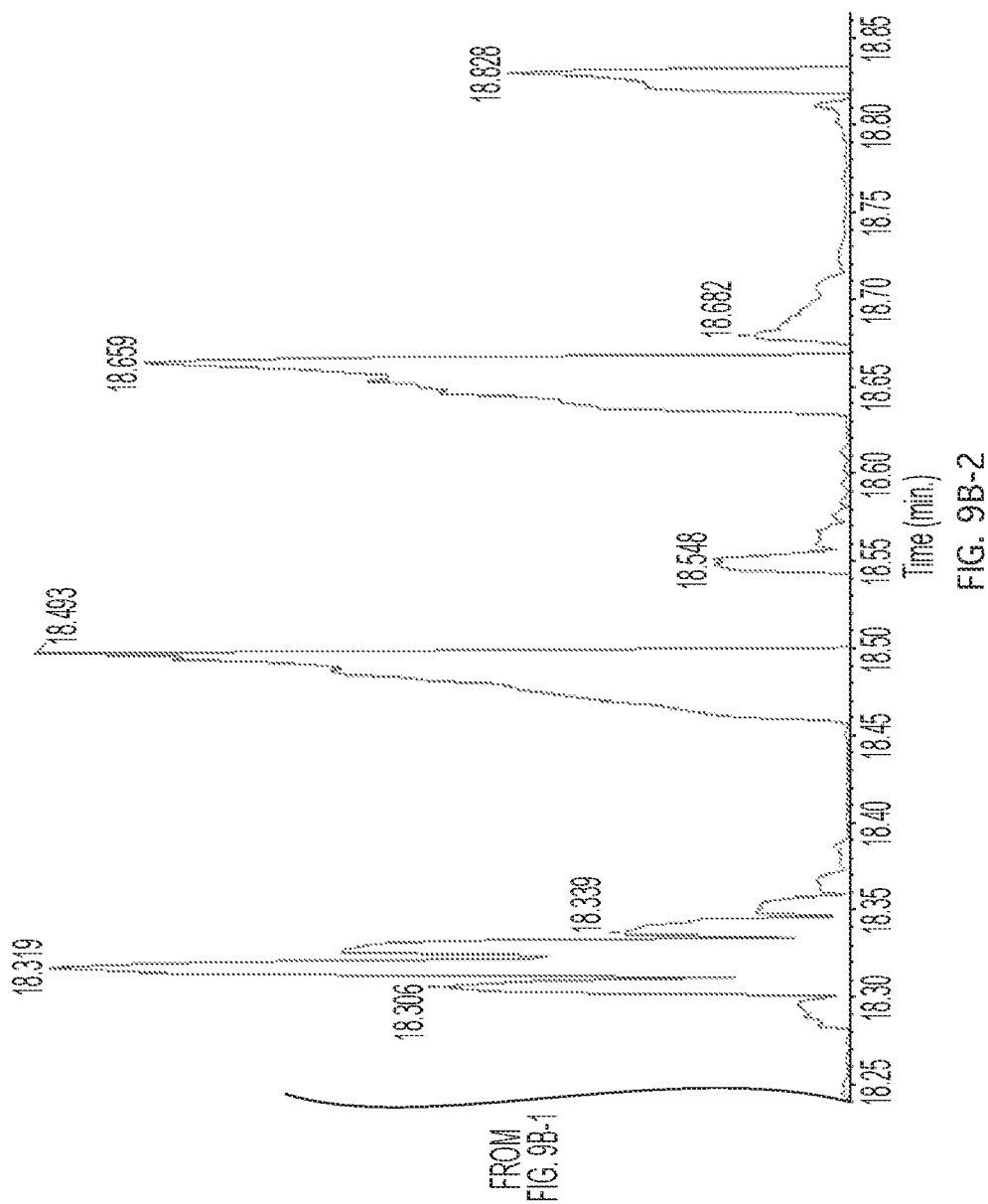
Figure 9C:
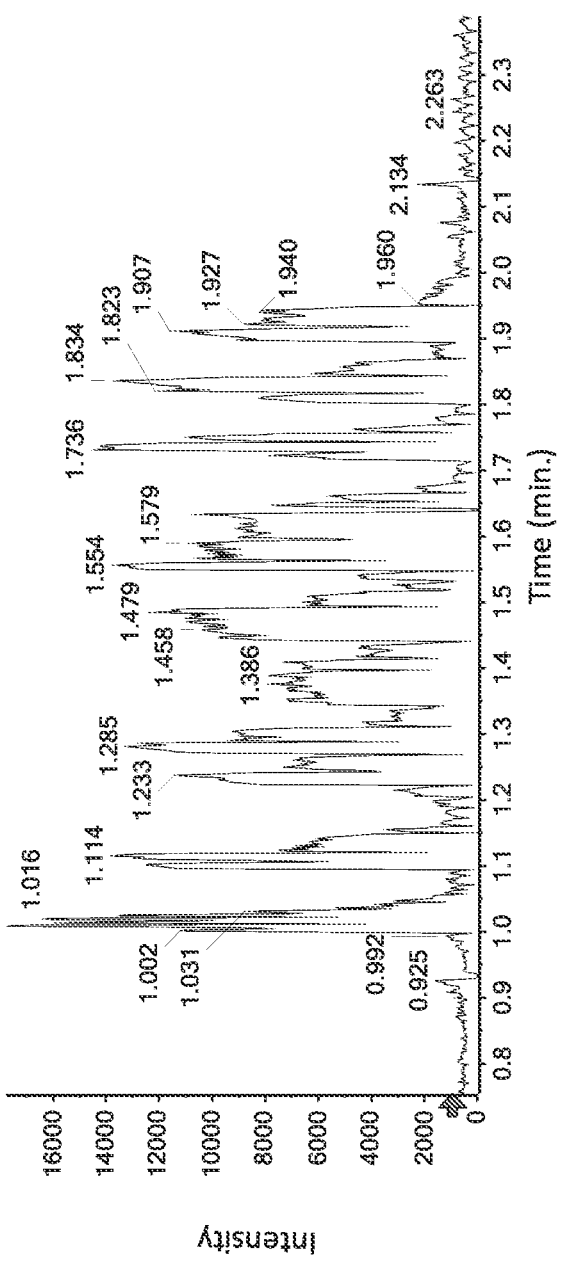
Figures 1, 9D:
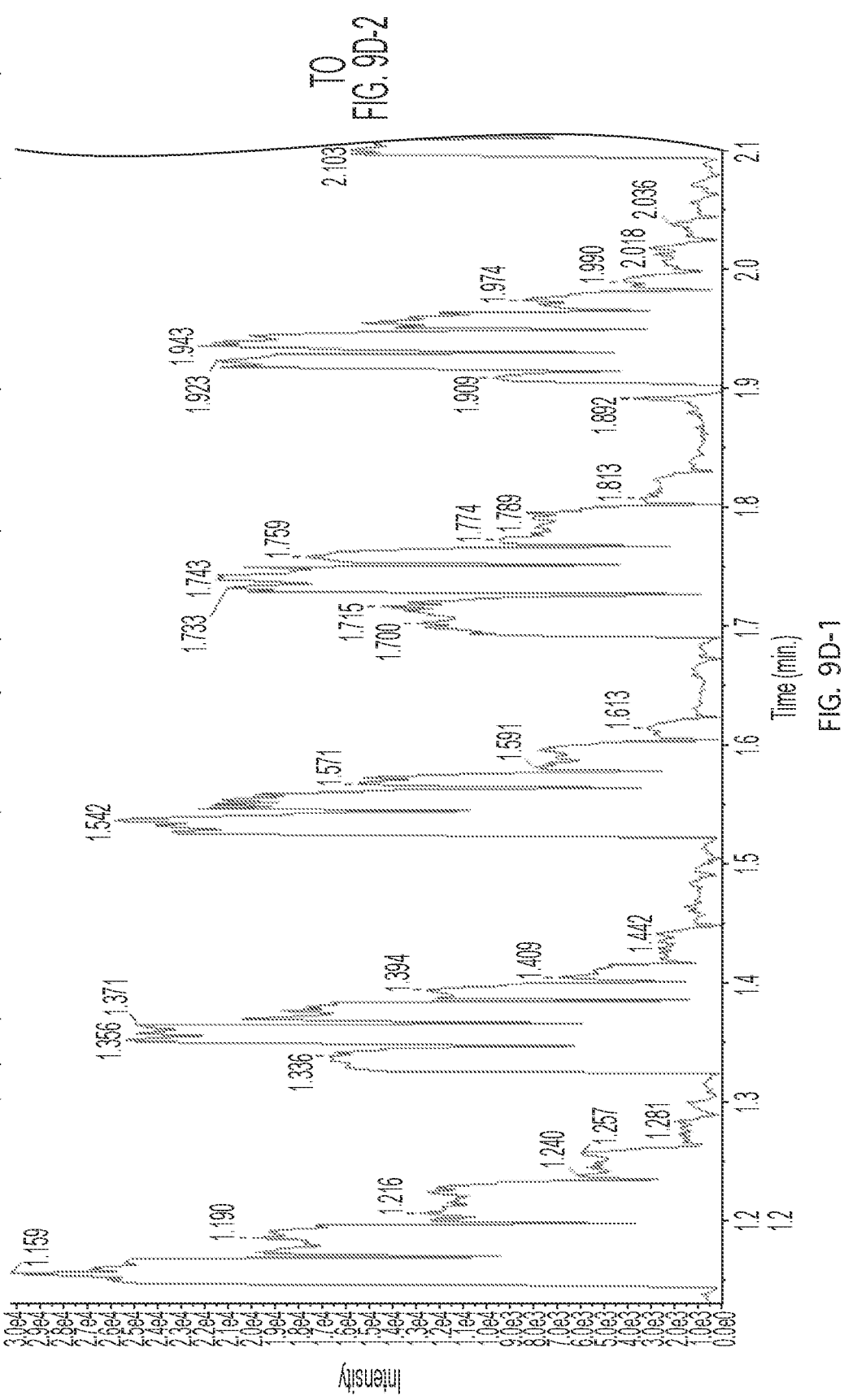

Solutions of 100 nM reserpine were prepared first in neat 50% MeOH:$H_2O$, and then this solution was spiked with 10% beta-galactosidase and loaded into a source well of an acoustically compatible source plate. A series of samples with increasing concentration of plasma digest was then tested, starting with 10% plasma, 50% plasma, and 90% plasma. 50 µL aliquots of sample were loaded into source wells and a series of 2.5 nL droplets was acoustically ejected at 5-second intervals from the source well into the fluid vortex at the open port of the flow probe. The results are presented in the spectra of FIGS. 8A (standard), 8B (10% digested beta-galactosidase), 8C (10% digested plasma), 8D (50% digested plasma), and 8E (90% digested plasma), which show that for single droplet ejection no matrix suppression effects were observed up to the highest concentration of 90% (nearly pure) plasma digest with the analyte reserpine.

Onset of matrix suppression was experimentally observed with the 10% concentration of plasma digest at ejection volumes of ~200 nL (80 droplets).

The process was repeated using injections of one droplet and ten droplets of 100 nM reserpine in both 50:50 MeOH: $H_2O$ and 90% digested plasma. The results, presented in FIG. 9A-9D, show a similar response for these two matrices, suggesting that matrix ion suppression issues are mitigated with the ADE-flow probe system at low transfer volumes.

We claim:

1. A system for transporting a fluid sample to an analytical instrument, comprising:
    a sampling probe;
    an acoustic ejector configured to successively eject discrete fluid sample droplets from a fluid sample into a sampling tip of the sampling probe; and
    a fluid handling system comprising:
    a pump configured to supply a flow of solvent from a solvent source to the sampling tip at a solvent inflow rate, causing a mixing of the fluid sample droplets with the solvent to form an analyte-solvent dilution,
    a sample outlet configured to direct the analyte-solvent dilution to the analytical instrument;
    one or more conduits configured to transport the analyte-solvent dilution from the sampling tip to the sample outlet at a solvent aspiration rate; and
    a controller configured to adjust a relative value of the solvent inflow rate and the solvent aspiration rate, causing a particular terminal flow pattern at the sampling tip.

2. The system of claim 1, wherein the particular terminal flow pattern comprises a vortex, a supercritical vortex, a subcritical vortex, balanced flow, or a pendant drop.

3. The system of claim 2, wherein the particular terminal flow pattern is a supercritical vortex.

4. The system of claim 1, wherein the pump comprises a displacement pump, a velocity pump, a buoyancy pump, or a syringe pump.

5. The system of claim 1, wherein the fluid handling system further comprises a sampling pump configured to control the solvent aspiration rate.

6. The system of claim 1, wherein the fluid handling system comprises an aspirating nebulization system configured to control the solvent aspiration rate.

7. The system of claim 6, wherein the aspirating nebulization system comprises:
    a nebulizing gas source, wherein nebulizing gas is directed over the outside of the sample outlet, and
    a gas pressure regulator that controls the flow of the nebulizing gas.

8. The system of claim 7, wherein the analytical instrument is a mass spectrometer system and the aspirating nebulization system is part of an electrospray ion source.

9. The system of claim 8, wherein the sample outlet is configured as an electrospray tip of the electrospray ion source.

10. The system of claim 1, wherein the sampling probe comprises an outer capillary and an inner capillary, wherein a distance between a tip of the outer capillary tip and a tip of the inner capillary tip is adjustable to adjust the particular terminal flow pattern.

11. A method for transporting a fluid sample to an analytical instrument, comprising:
    supplying solvent to a sampling tip of a sampling probe at a solvent inflow rate;
    acoustically ejecting one or more discrete fluid sample droplets successively from a fluid sample into the sampling tip;
    diluting the fluid sample droplets with the solvent to form an analyte-solvent dilution;
    transporting the analyte-sample dilution to a sample outlet at a solvent aspiration rate to direct the analyte-solvent dilution to the analytical instrument; and
    adjusting a relative value of the solvent inflow rate and the solvent aspiration rate, causing a particular terminal flow pattern at the sampling tip.

12. The method of claim 11, wherein the particular terminal flow pattern at the sampling tip comprises a vortex, a supercritical vortex, a subcritical vortex, balanced flow, or a pendant drop.

13. The method of claim 12, wherein the terminal flow pattern is a supercritical vortex.

14. The method of claim 11, wherein a solvent pump controls the solvent inflow rate.

15. The method of claim 11, wherein a sample pump controls the solvent aspiration rate.

16. The method of claim 11, wherein an aspirating nebulization system controls the solvent aspiration rate.

17. The method of claim 16, wherein the aspirating nebulization system comprises:
    a nebulizing gas source, wherein nebulizing gas is directed over the outside of the sample outlet, and
    a gas pressure regulator that controls the flow of the nebulizing gas.

18. The method of claim 17, wherein the analytical instrument is a mass spectrometer system and the aspirating nebulization system is part of an electrospray ion source of the mass spectrometer system.

19. The method of claim 18, wherein the sample outlet is configured as an electrospray tip of the electrospray ion source.

20. The method of claim 11, further comprising adjusting a distance between an outer capillary tip and an inner capillary tip of the sampling probe to adjust the particular terminal flow pattern.

* * * * *